US012712891B2

(12) United States Patent
Vargas et al.

(10) Patent No.: US 12,712,891 B2
(45) Date of Patent: Aug. 18, 2026

(54) SYSTEMS AND METHODS FOR MITIGATION AND REMEDIATION OF CYBERSECURITY THREATS

(71) Applicant: LUMU TECHNOLGIES, INC., Doral, FL (US)

(72) Inventors: Javier Fernando Vargas, Doral, FL (US); Claudio Deiro, Doral, FL (US); Mario Lobo, Doral, FL (US); Angelica Castañeda, Doral, FL (US); Ricardo Villadiego, Doral, FL (US)

(73) Assignee: LUMU TECHNOLGIES, INC., Doral, FL (US)

( * ) Notice: Subject to any disclaimer, the term of this patent is extended or adjusted under 35 U.S.C. 154(b) by 187 days.

(21) Appl. No.: 18/640,805

(22) Filed: Apr. 19, 2024

(65) Prior Publication Data

US 2026/0025391 A1 Jan. 22, 2026

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01); *H04L 63/0263* (2013.01)

(58) Field of Classification Search
CPC .. H04L 63/1416; H04L 63/0263; H04L 41/16
USPC .......................................................... 726/22
See application file for complete search history.

(56) References Cited

U.S. PATENT DOCUMENTS

| | | | | |
|---|---|---|---|---|
| 11,677,786 | B1 * | 6/2023 | Vashisht | H04L 63/1433 726/22 |
| 12,388,848 | B2 * | 8/2025 | Dalcher | H04L 63/20 |
| 2020/0195673 | A1 * | 6/2020 | Lee | H04L 45/70 |
| 2022/0101326 | A1 * | 3/2022 | Kim | G06Q 20/4016 |
| 2022/0109681 | A1 * | 4/2022 | Hamdi | H04L 43/0817 |
| 2022/0377103 | A1 * | 11/2022 | Shaw | H04L 63/20 |
| 2024/0039954 | A1 * | 2/2024 | Shete | H04L 63/1425 |
| 2024/0070273 | A1 * | 2/2024 | Almogbil | G06N 20/20 |
| 2024/0163300 | A1 * | 5/2024 | Kumar | H04L 63/205 |

* cited by examiner

*Primary Examiner* — Michael S McNally
(74) *Attorney, Agent, or Firm* — Bradley Arant Boutlt Cummings LLP; Adam J. Thompson

(57) ABSTRACT

A cybersecurity system for autonomous threat management within network environments may utilize one or more computing devices equipped with processors to operate a security agent. The security agent may receive indications of potential cybersecurity threats and conduct an analysis based on the threat's characteristics and context within the network. The security agent may evaluate one or more of the threat's type, risk level, and persistence, and determine associated conditions. Responsive actions (e.g., isolating network segments, blocking malicious traffic, deploying patches, modifying firewall rules, and/or alerting administrators, without requiring manual approval) may be autonomously determined and executed based on the evaluations. The security agent's adaptability may be enhanced by machine learning algorithms that refine threat assessments and responses over time, providing a dynamic defense mechanism against evolving cybersecurity threats.

20 Claims, 15 Drawing Sheets

FIG. 3

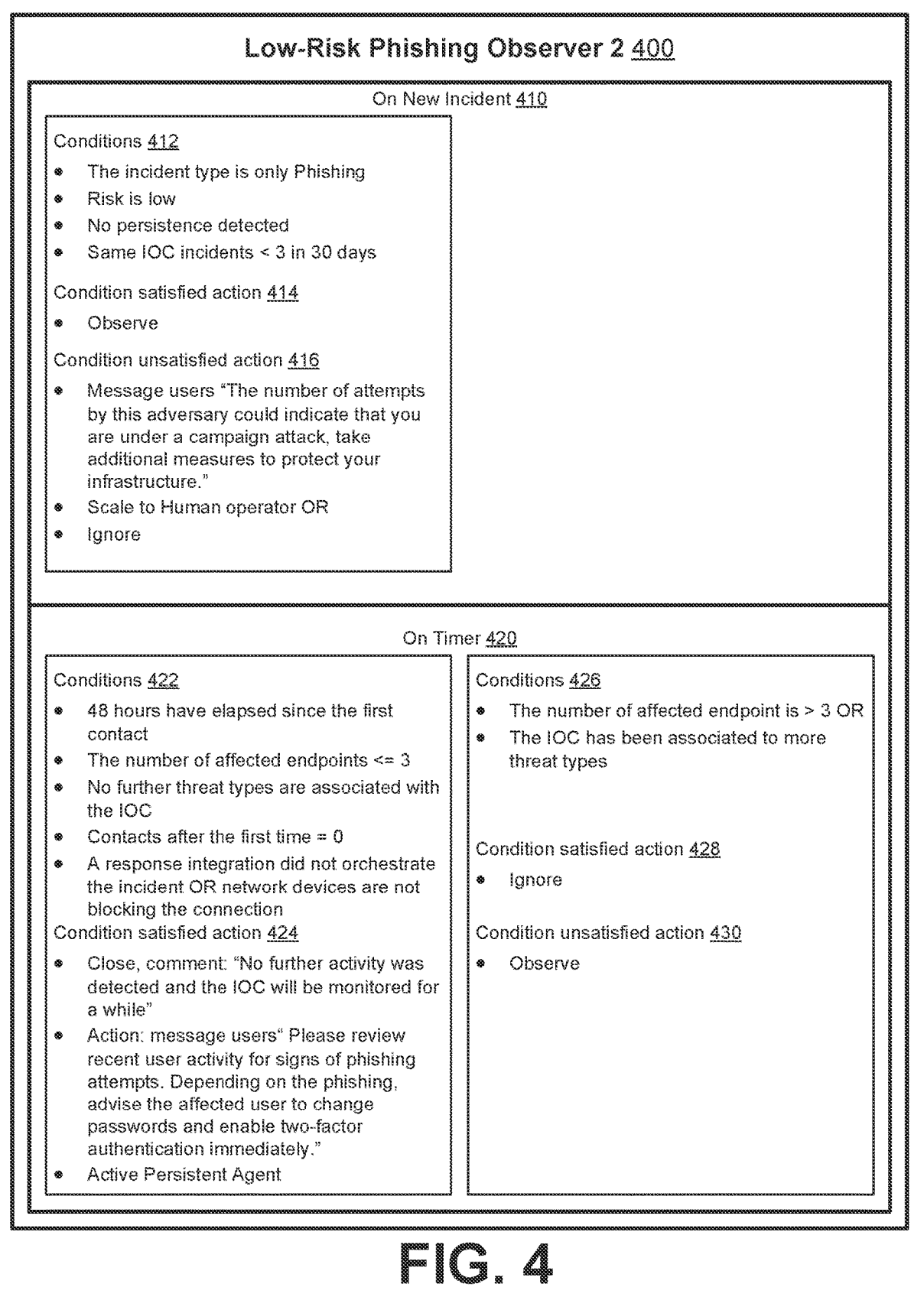

Low-Risk Phishing Observer 2 400

On New Incident 410

Conditions 412
- The incident type is only Phishing
- Risk is low
- No persistence detected
- Same IOC incidents < 3 in 30 days Condition satisfied action 414
- Observe Condition unsatisfied action 416
- Message users "The number of attempts by this adversary could indicate that you are under a campaign attack, take additional measures to protect your infrastructure."
- Scale to Human operator OR
- Ignore

On Timer 420

Conditions 422
- 48 hours have elapsed since the first contact
- The number of affected endpoints <= 3
- No further threat types are associated with the IOC
- Contacts after the first time = 0
- A response integration did not orchestrate the incident OR network devices are not blocking the connection Condition satisfied action 424
- Close, comment: "No further activity was detected and the IOC will be monitored for a while"
- Action: message users" Please review recent user activity for signs of phishing attempts. Depending on the phishing, advise the affected user to change passwords and enable two-factor authentication immediately."
- Active Persistent Agent Conditions 426
- The number of affected endpoint is > 3 OR
- The IOC has been associated to more threat types Condition satisfied action 428
- Ignore Condition unsatisfied action 430
- Observe

FIG. 4

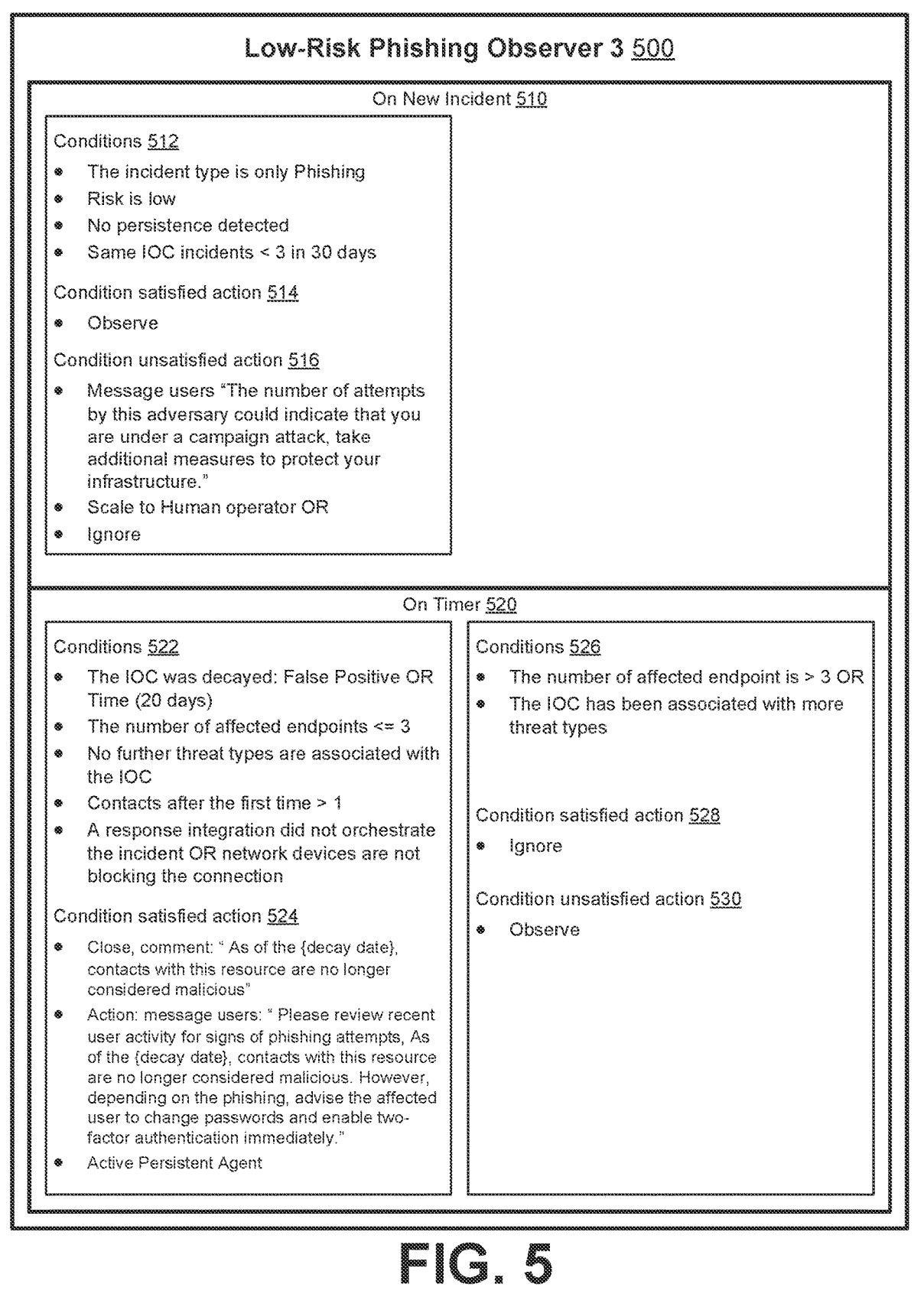

Low-Risk Phishing Observer 3 500

On New Incident 510

Conditions 512
- The incident type is only Phishing
- Risk is low
- No persistence detected
- Same IOC incidents < 3 in 30 days Condition satisfied action 514
- Observe Condition unsatisfied action 516
- Message users "The number of attempts by this adversary could indicate that you are under a campaign attack, take additional measures to protect your infrastructure."
- Scale to Human operator OR
- Ignore On Timer 520

Conditions 522
- The IOC was decayed: False Positive OR Time (20 days)
- The number of affected endpoints <= 3
- No further threat types are associated with the IOC
- Contacts after the first time > 1
- A response integration did not orchestrate the incident OR network devices are not blocking the connection Condition satisfied action 524
- Close, comment: " As of the {decay date}, contacts with this resource are no longer considered malicious"
- Action: message users: " Please review recent user activity for signs of phishing attempts, As of the {decay date}, contacts with this resource are no longer considered malicious. However, depending on the phishing, advise the affected user to change passwords and enable two-factor authentication immediately."
- Active Persistent Agent Conditions 526
- The number of affected endpoint is > 3 OR
- The IOC has been associated with more threat types Condition satisfied action 528
- Ignore Condition unsatisfied action 530
- Observe

FIG. 5

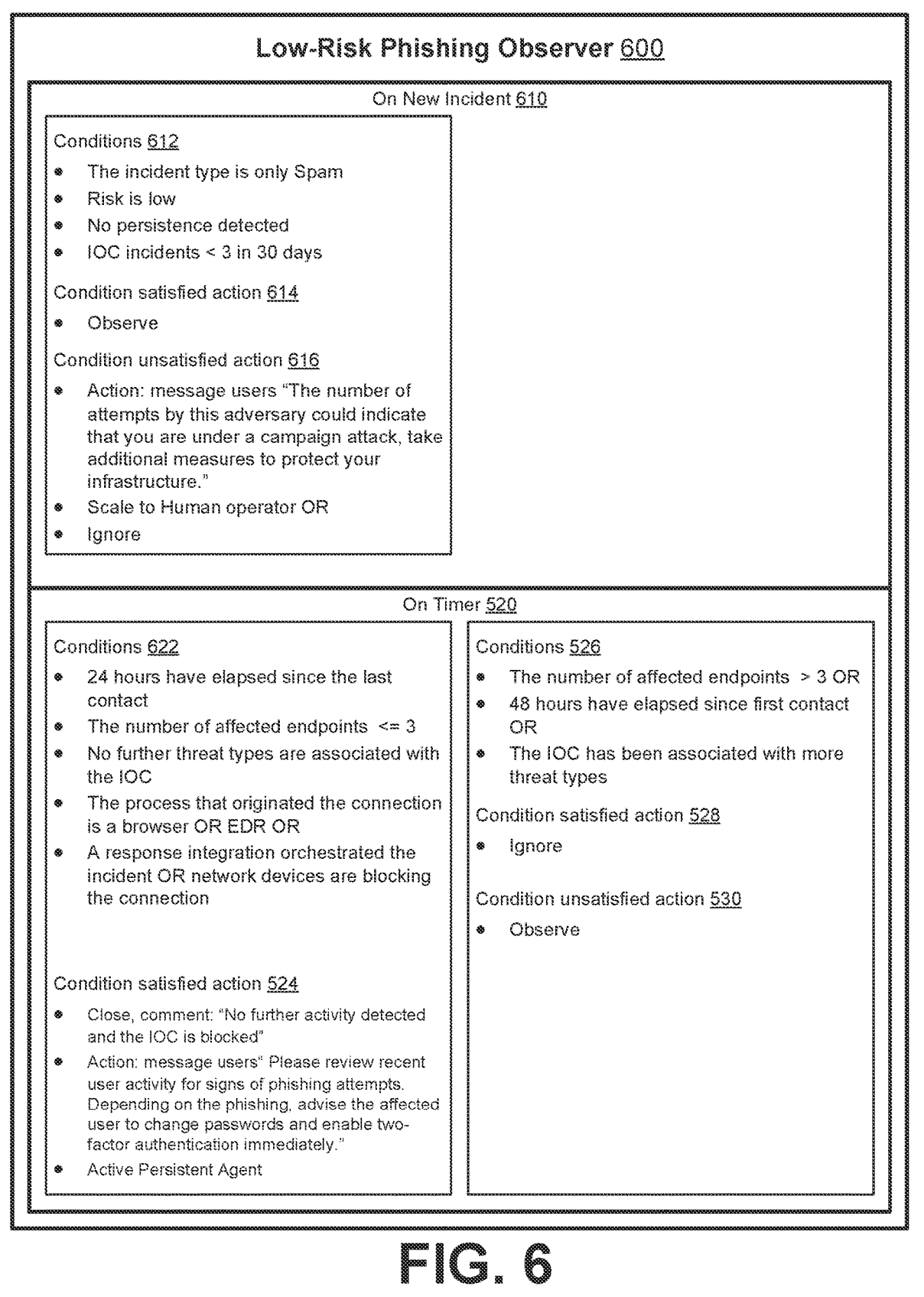

Low-Risk Phishing Observer 600

On New Incident 610

Conditions 612
- The incident type is only Spam
- Risk is low
- No persistence detected
- IOC incidents < 3 in 30 days Condition satisfied action 614
- Observe Condition unsatisfied action 616
- Action: message users "The number of attempts by this adversary could indicate that you are under a campaign attack, take additional measures to protect your infrastructure."
- Scale to Human operator OR
- Ignore On Timer 520

Conditions 622
- 24 hours have elapsed since the last contact
- The number of affected endpoints <= 3
- No further threat types are associated with the IOC
- The process that originated the connection is a browser OR EDR OR
- A response integration orchestrated the incident OR network devices are blocking the connection Condition satisfied action 524
- Close, comment: "No further activity detected and the IOC is blocked"
- Action: message users" Please review recent user activity for signs of phishing attempts. Depending on the phishing, advise the affected user to change passwords and enable two-factor authentication immediately."
- Active Persistent Agent Conditions 526
- The number of affected endpoints > 3 OR
- 48 hours have elapsed since first contact OR
- The IOC has been associated with more threat types Condition satisfied action 528
- Ignore Condition unsatisfied action 530
- Observe

FIG. 6

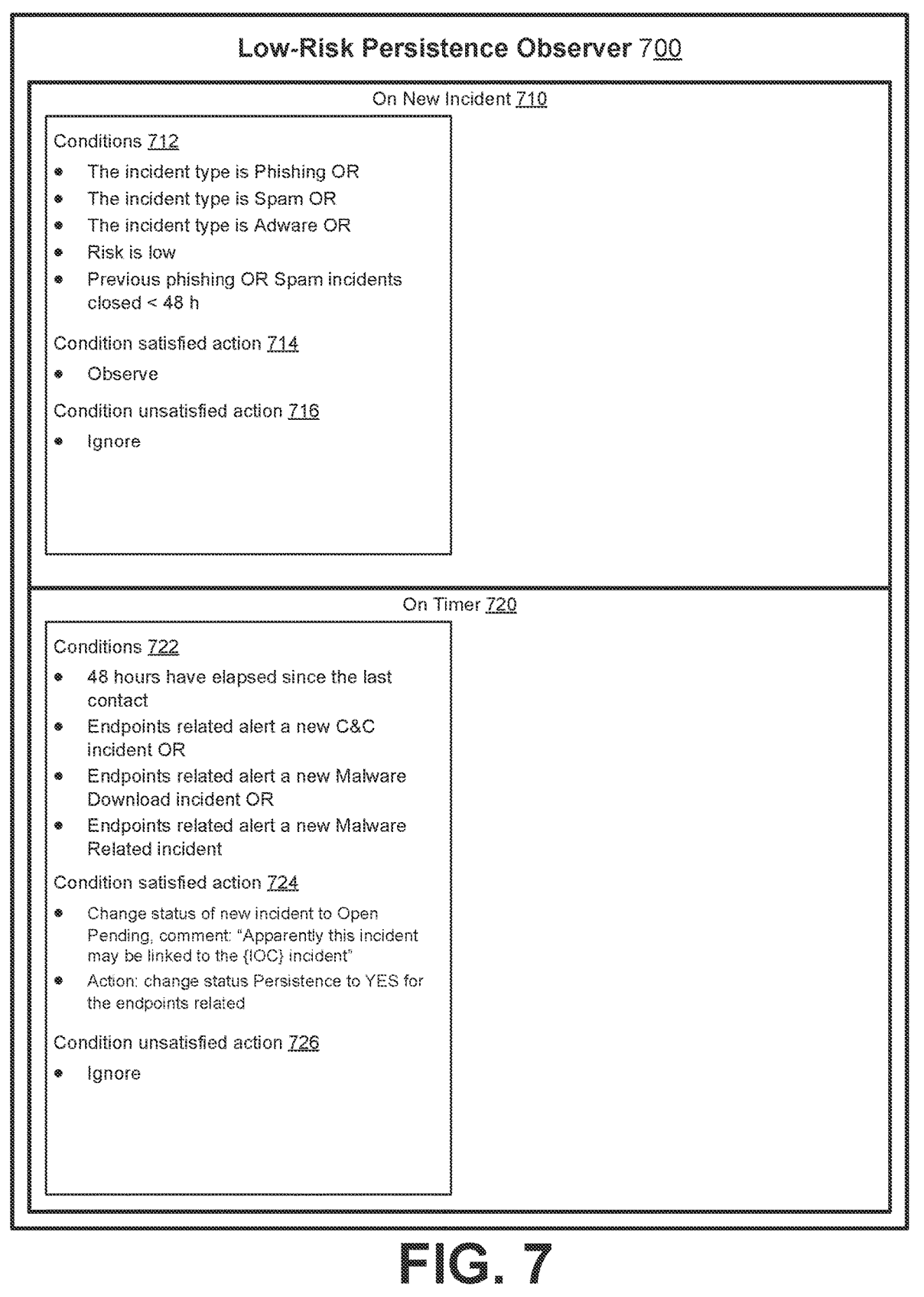

Low-Risk Persistence Observer 700

On New Incident 710

Conditions 712
- The incident type is Phishing OR
- The incident type is Spam OR
- The incident type is Adware OR
- Risk is low
- Previous phishing OR Spam incidents closed < 48 h Condition satisfied action 714
- Observe Condition unsatisfied action 716
- Ignore On Timer 720

Conditions 722
- 48 hours have elapsed since the last contact
- Endpoints related alert a new C&C incident OR
- Endpoints related alert a new Malware Download incident OR
- Endpoints related alert a new Malware Related incident Condition satisfied action 724
- Change status of new incident to Open Pending, comment: "Apparently this incident may be linked to the {IOC} incident"
- Action: change status Persistence to YES for the endpoints related Condition unsatisfied action 726
- Ignore

FIG. 7

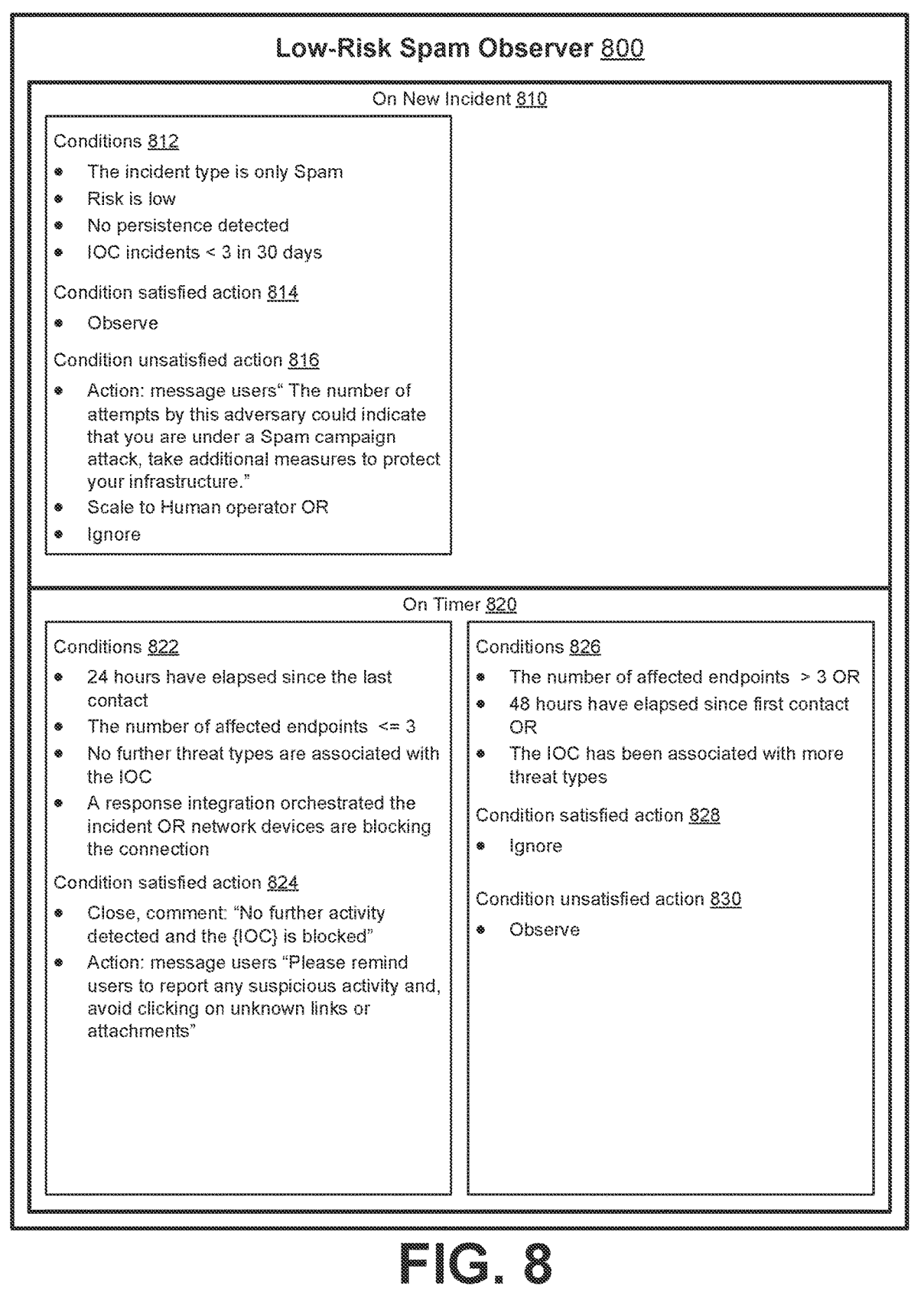

Low-Risk Spam Observer 800

On New Incident 810

Conditions 812
- The incident type is only Spam
- Risk is low
- No persistence detected
- IOC incidents < 3 in 30 days Condition satisfied action 814
- Observe Condition unsatisfied action 816
- Action: message users“ The number of attempts by this adversary could indicate that you are under a Spam campaign attack, take additional measures to protect your infrastructure.”
- Scale to Human operator OR
- Ignore On Timer 820

Conditions 822
- 24 hours have elapsed since the last contact
- The number of affected endpoints <= 3
- No further threat types are associated with the IOC
- A response integration orchestrated the incident OR network devices are blocking the connection Condition satisfied action 824
- Close, comment: “No further activity detected and the {IOC} is blocked”
- Action: message users “Please remind users to report any suspicious activity and, avoid clicking on unknown links or attachments”

Conditions 826
- The number of affected endpoints > 3 OR
- 48 hours have elapsed since first contact OR
- The IOC has been associated with more threat types Condition satisfied action 828
- Ignore Condition unsatisfied action 830
- Observe

FIG. 8

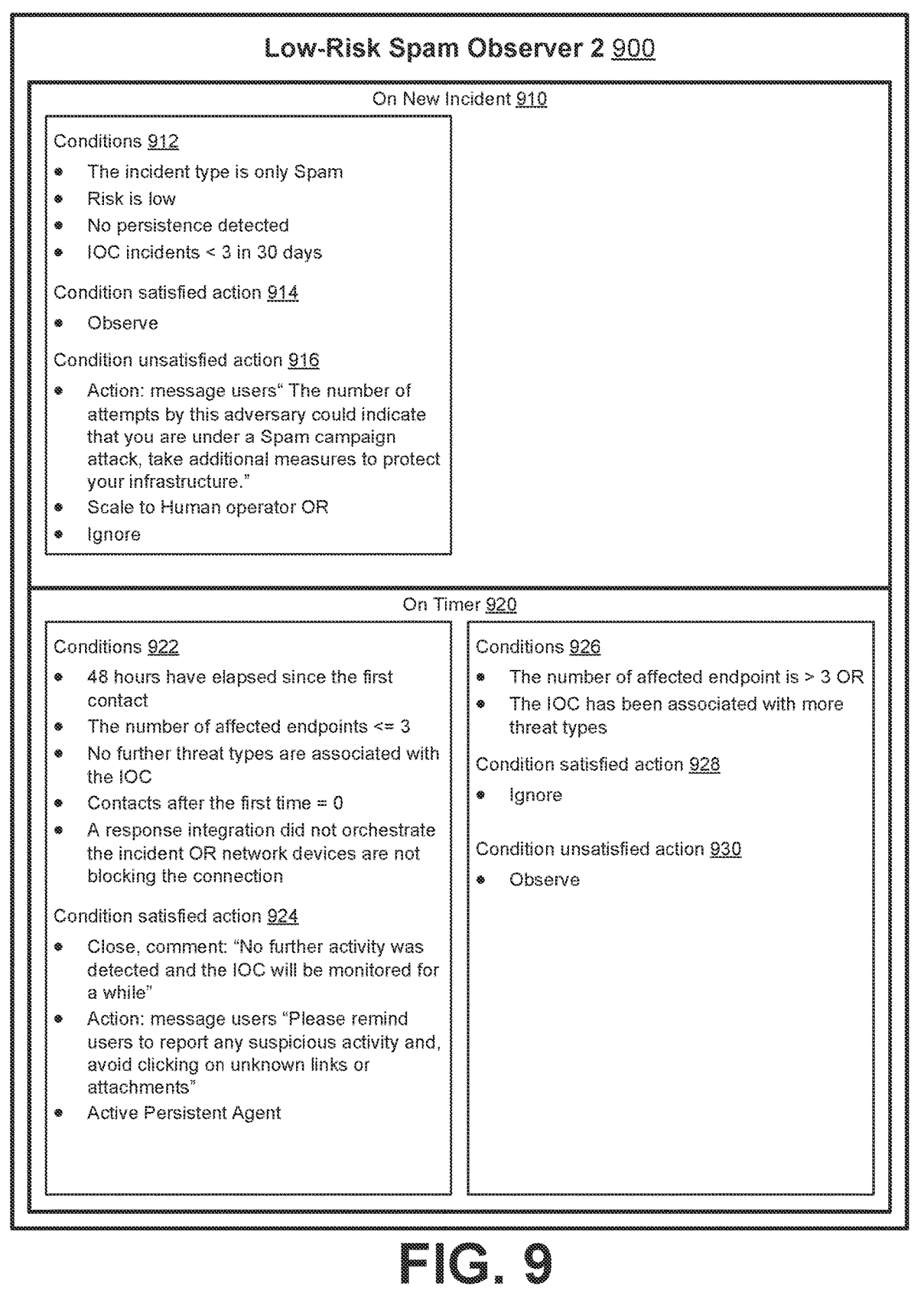

Low-Risk Spam Observer 2 900

On New Incident 910

Conditions 912
- The incident type is only Spam
- Risk is low
- No persistence detected
- IOC incidents < 3 in 30 days Condition satisfied action 914
- Observe Condition unsatisfied action 916
- Action: message users" The number of attempts by this adversary could indicate that you are under a Spam campaign attack, take additional measures to protect your infrastructure."
- Scale to Human operator OR
- Ignore On Timer 920

Conditions 922
- 48 hours have elapsed since the first contact
- The number of affected endpoints <= 3
- No further threat types are associated with the IOC
- Contacts after the first time = 0
- A response integration did not orchestrate the incident OR network devices are not blocking the connection Condition satisfied action 924
- Close, comment: "No further activity was detected and the IOC will be monitored for a while"
- Action: message users "Please remind users to report any suspicious activity and, avoid clicking on unknown links or attachments"
- Active Persistent Agent Conditions 926
- The number of affected endpoint is > 3 OR
- The IOC has been associated with more threat types Condition satisfied action 928
- Ignore Condition unsatisfied action 930
- Observe

FIG. 9

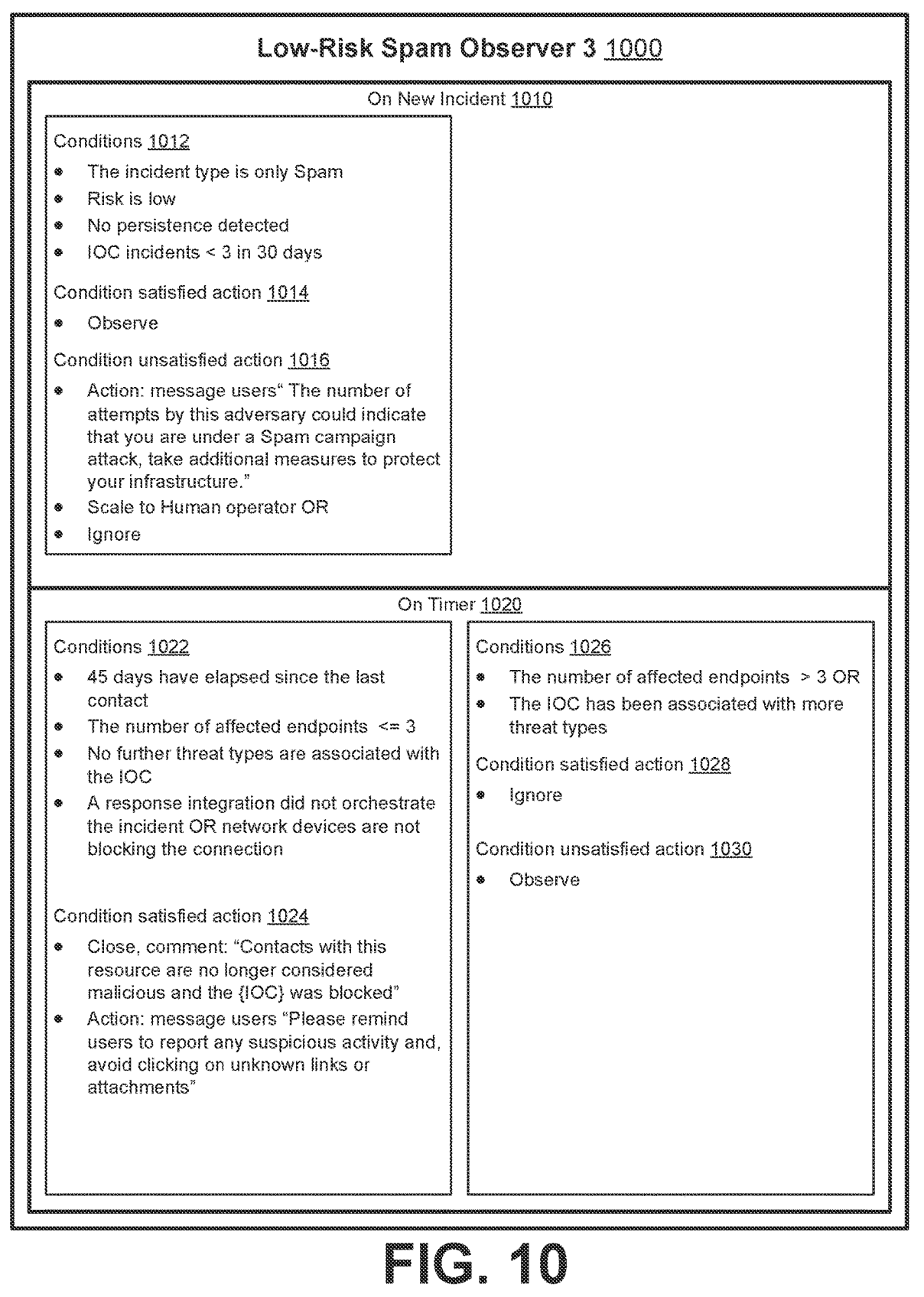

Low-Risk Spam Observer 3 1000

On New Incident 1010

Conditions 1012
- The incident type is only Spam
- Risk is low
- No persistence detected
- IOC incidents < 3 in 30 days Condition satisfied action 1014
- Observe Condition unsatisfied action 1016
- Action: message users“ The number of attempts by this adversary could indicate that you are under a Spam campaign attack, take additional measures to protect your infrastructure.”
- Scale to Human operator OR
- Ignore On Timer 1020

Conditions 1022
- 45 days have elapsed since the last contact
- The number of affected endpoints <= 3
- No further threat types are associated with the IOC
- A response integration did not orchestrate the incident OR network devices are not blocking the connection Condition satisfied action 1024
- Close, comment: “Contacts with this resource are no longer considered malicious and the {IOC} was blocked”
- Action: message users “Please remind users to report any suspicious activity and, avoid clicking on unknown links or attachments”

Conditions 1026
- The number of affected endpoints > 3 OR
- The IOC has been associated with more threat types Condition satisfied action 1028
- Ignore Condition unsatisfied action 1030
- Observe

FIG. 10

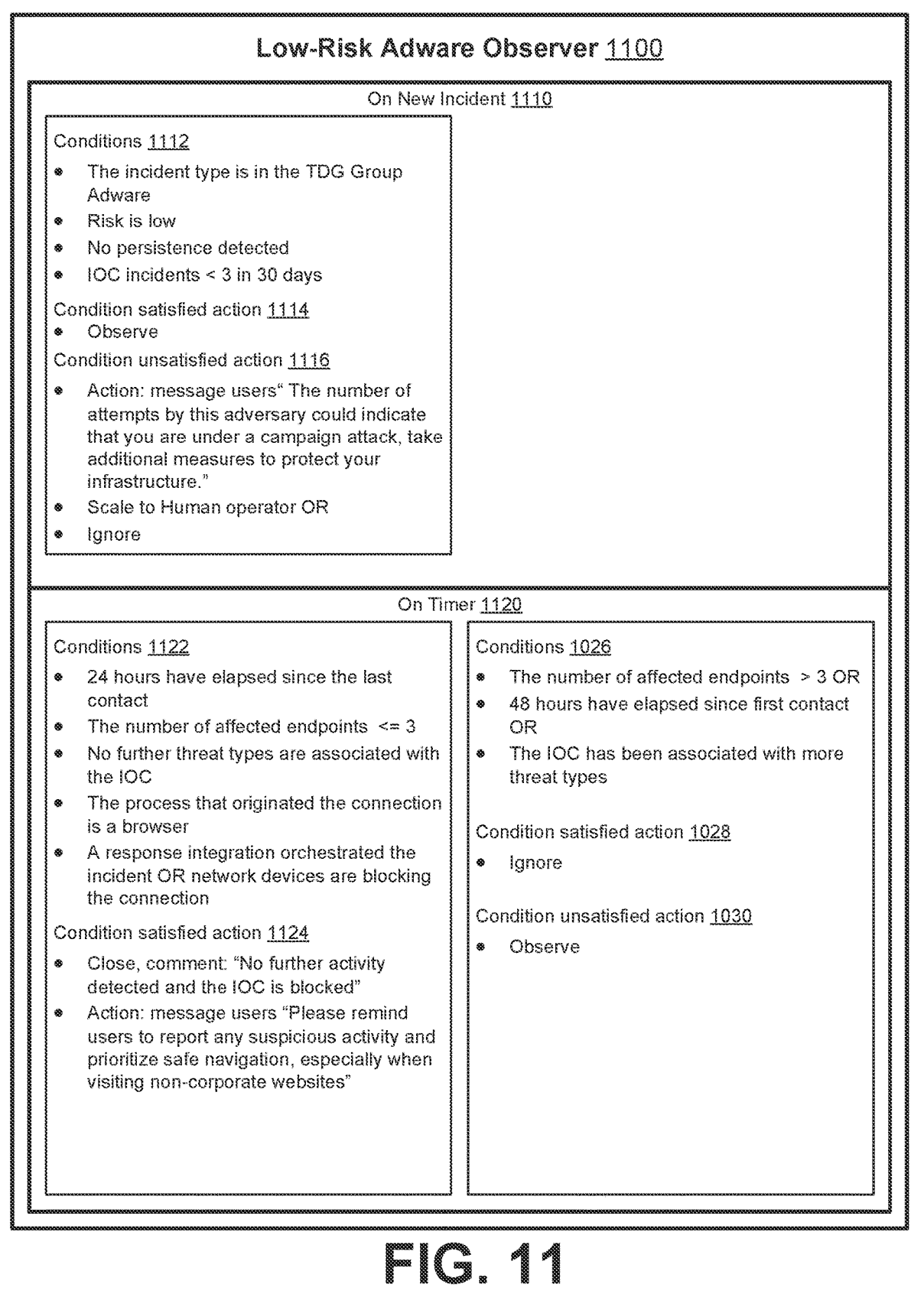

Low-Risk Adware Observer 1100

On New Incident 1110

Conditions 1112
- The incident type is in the TDG Group Adware
- Risk is low
- No persistence detected
- IOC incidents < 3 in 30 days Condition satisfied action 1114
- Observe Condition unsatisfied action 1116
- Action: message users" The number of attempts by this adversary could indicate that you are under a campaign attack, take additional measures to protect your infrastructure."
- Scale to Human operator OR
- Ignore On Timer 1120

Conditions 1122
- 24 hours have elapsed since the last contact
- The number of affected endpoints <= 3
- No further threat types are associated with the IOC
- The process that originated the connection is a browser
- A response integration orchestrated the incident OR network devices are blocking the connection Condition satisfied action 1124
- Close, comment: "No further activity detected and the IOC is blocked"
- Action: message users "Please remind users to report any suspicious activity and prioritize safe navigation, especially when visiting non-corporate websites"

Conditions 1026
- The number of affected endpoints > 3 OR
- 48 hours have elapsed since first contact OR
- The IOC has been associated with more threat types Condition satisfied action 1028
- Ignore Condition unsatisfied action 1030
- Observe

FIG. 11

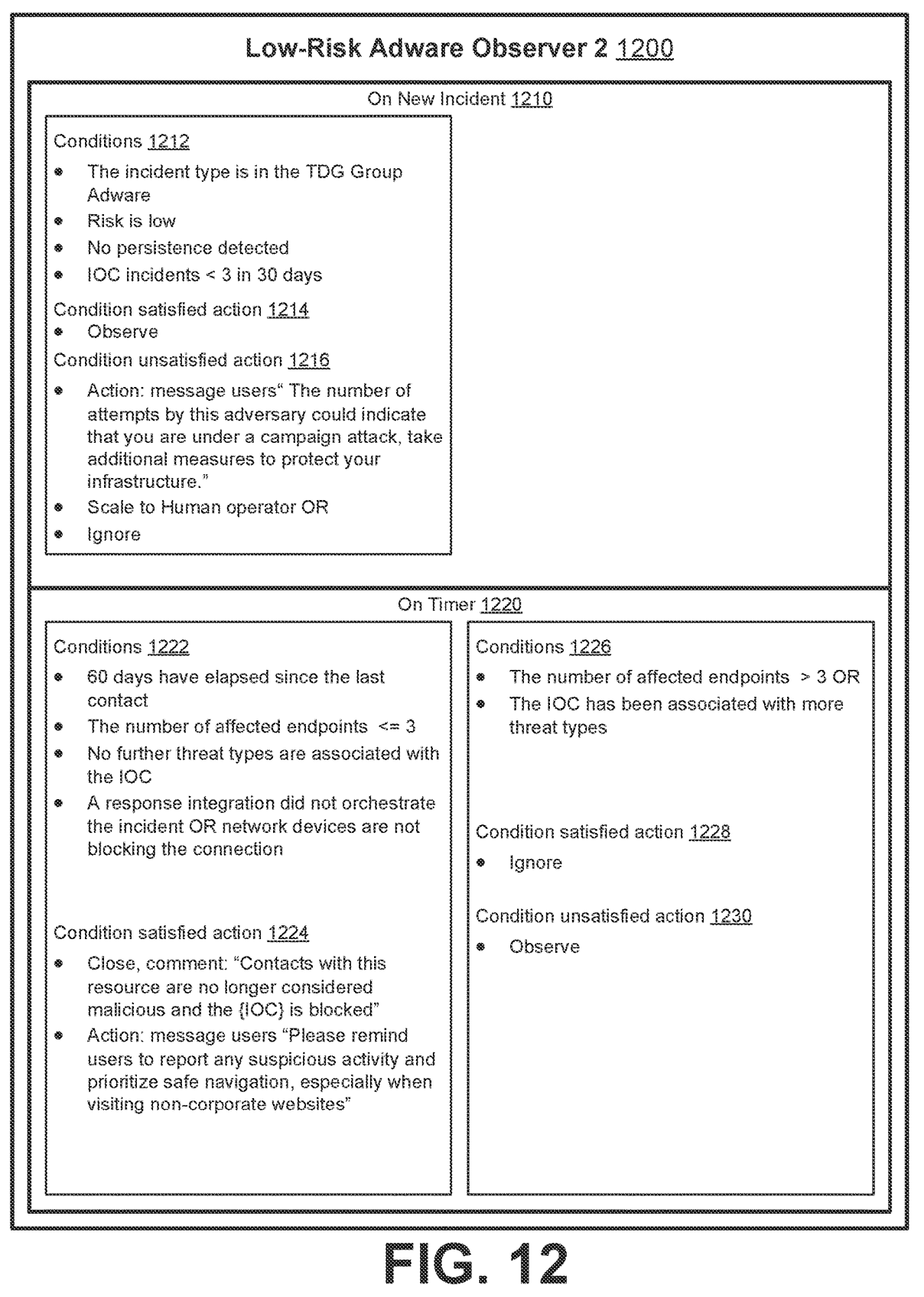

Low-Risk Adware Observer 2 1200

On New Incident 1210

Conditions 1212
- The incident type is in the TDG Group Adware
- Risk is low
- No persistence detected
- IOC incidents < 3 in 30 days Condition satisfied action 1214
- Observe Condition unsatisfied action 1216
- Action: message users" The number of attempts by this adversary could indicate that you are under a campaign attack, take additional measures to protect your infrastructure."
- Scale to Human operator OR
- Ignore On Timer 1220

Conditions 1222
- 60 days have elapsed since the last contact
- The number of affected endpoints <= 3
- No further threat types are associated with the IOC
- A response integration did not orchestrate the incident OR network devices are not blocking the connection Condition satisfied action 1224
- Close, comment: "Contacts with this resource are no longer considered malicious and the {IOC} is blocked"
- Action: message users "Please remind users to report any suspicious activity and prioritize safe navigation, especially when visiting non-corporate websites"

Conditions 1226
- The number of affected endpoints > 3 OR
- The IOC has been associated with more threat types Condition satisfied action 1228
- Ignore Condition unsatisfied action 1230
- Observe

FIG. 12

SYSTEMS AND METHODS FOR MITIGATION AND REMEDIATION OF CYBERSECURITY THREATS

TECHNICAL FIELD

The present disclosure generally relates to systems and methods for cybersecurity and, more specifically, the automated detection, mitigation, and remediation of cybersecurity threats within computer networks through the use of intelligent and adaptive response mechanisms.

BACKGROUND

Cybersecurity encompasses the practices, technologies, and processes designed to protect computer systems, networks, devices, and data from unauthorized access, attack, or damage. In today's digitally interconnected world, cybersecurity has become a paramount concern for individuals, businesses, and governments alike. The exponential growth in digital data, the ubiquity of internet connectivity, and the increasing reliance on digital platforms for personal, financial, and operational activities have all contributed to the escalating importance of cybersecurity.

The need for cybersecurity arises from a constant threat posed by cybercriminals, state actors, and malicious insiders who aim to exploit vulnerabilities for financial gain, espionage, sabotage, or other malicious intents. Cybersecurity threats range from malware, phishing, and ransomware attacks to more sophisticated cyber-espionage and cyberwarfare tactics. These threats may lead to significant financial losses, damage to an organization's reputation, theft of sensitive and personal information, and even disruption to critical infrastructure and national security.

Conventional cybersecurity systems employ a variety of mechanisms to detect threats and protect digital assets. These mechanisms are designed to identify and respond to a wide range of cybersecurity threats, from common malware to sophisticated nation-state attacks. As threat actors continuously evolve their tactics, techniques, and procedures, it is crucial for cybersecurity systems to adapt and incorporate more advanced technologies. For example, conventional cybersecurity systems often require significant manual intervention to respond to detected threats. The reliance on cybersecurity analysts to interpret and act upon alerted threats not only introduces delays in response times but also places a substantial burden on organizational resources, particularly in environments where the volume of alerts may overwhelm even well-staffed security operations centers. Moreover, the static nature of traditional defense mechanisms struggles to keep pace with the sophistication and agility of modern cyber adversaries, leading to potential gaps in threat coverage.

Accordingly, there is an unresolved need for cybersecurity systems and methods for maintaining operational efficiency, minimizing response times, and dynamically adapting to new and evolving threat vectors without excessive dependency on manual processes.

This background information is provided to reveal information believed by the applicant to be of possible relevance. No admission is necessarily intended, nor should be construed, that any of the preceding information constitutes prior art.

SUMMARY

Briefly described, and in various aspects, the present disclosure generally relates to cybersecurity. Moreover, the present disclosure is particularly relevant to systems and methods for providing a resilient and responsive security posture (e.g., an organization's ability to predict, prevent, and respond to cyberthreats), capable of autonomously mitigating threats in real-time, thereby reducing a window of exposure and enhancing overall network security.

According to some aspects, an advanced cybersecurity system is disclosed for the automated detection, assessment, and/or response to cybersecurity threats, thereby significantly mitigating potential damages and enhancing the robustness of network defenses. The disclosed system may employ a multifaceted approach to cybersecurity by incorporating a series of specialized agents that may monitor network activity, assess the risk of incidents, and/or execute appropriate remediation strategies based on a combination of deterministic logic, historical data analysis, and/or machine learning models. Each agent within the system may be tailored to handle specific types of cybersecurity threats, such as phishing, spam, and adware. These agents may contribute to the system's ability to automate the nuanced process of identifying, evaluating, and mitigating cybersecurity threats with minimal human intervention.

The agents may autonomously adjudicate on the nature and severity of threats based on a comprehensive set of criteria including the assessed risk level of an incident, evidence of persistence suggesting ongoing or potential future compromise, the frequency with which similar incidents have been observed, and historical context. The criteria may enable each agent to execute tailored responses ranging from the automatic closure of incidents deemed low risk to the escalation of more severe or complex threats that necessitate initiation of monitoring protocols or direct human intervention. For instance, a phishing attempt detected as low risk by an agent due to its containment by network defenses and the absence of further malicious activity may be automatically closed, while another incident showing signs of persistence or escalation may be flagged for further review.

Moreover, the system's architecture may facilitate a collaborative decision-making process among different agents, enhancing its ability to address threats in a holistic and nuanced manner. This collective response mechanism may ensure that the system's response to a threat is informed by a comprehensive analysis of all relevant factors, including but not limited to, the type of threat, its execution method, and the broader context of the network's security posture. By pooling the expertise and insights of various agents, the system may generate a more accurate and effective resolution strategy for a wide array of cybersecurity threats. For example, an agent specializing in phishing may detect an incident that, while initially seeming low risk, triggers further investigation by another agent focused on persistence detection. Together, the plurality of agents may provide a comprehensive threat assessment that accounts for immediate risks and potential future vulnerabilities.

This collaborative framework represents a significant evolution in cybersecurity strategies, offering a dynamic, intelligent, and highly adaptive response to cybersecurity threats. By leveraging the collective intelligence of specialized agents, the system may offer a more accurate, effective, and efficient resolution strategy, significantly enhancing the cybersecurity posture of the network it protects. Through this innovative approach, the system may not only address the immediate challenges posed by cybersecurity threats but also anticipates and mitigates potential future risks, ensuring a resilient and robust defense mechanism. By leveraging the capabilities of specialized agents to deliver a dynamic, intelligent, and highly automated response mechanism, the efficiency and effectiveness of cyber threat mitigation strategies may be elevated, and operational burdens traditionally associated with manual threat response processes may be significantly reduced.

According to some aspects, real-time responses to identified threats may be provided through integration with existing cybersecurity infrastructure. Real-time responses may include an ability to close incidents that are already contained, observe incidents for additional evidence of compromise, and escalate incidents requiring intervention for further action. The system's decision-making process may be informed by a comprehensive analysis of incident types, risk assessments, the number of affected endpoints, the history of similar incidents, and the potential for persistence or escalation of threats. Furthermore, the system may remain effective against both known and emerging cybersecurity threats by adapting and learning from ongoing network activity and threat evolution. The agents within the system may be continuously updated and expanded to address new types of cybersecurity threats, providing a scalable and versatile solution for cybersecurity management.

Moreover, the disclosure sets forth a significant advancement in the field of cybersecurity, offering a proactive, intelligent, and automated approach to threat detection, assessment, and remediation. By reducing the reliance on manual intervention and enhancing the speed and accuracy of responses to cybersecurity threats, aspects of the disclosure provide a comprehensive and efficient solution for safeguarding network environments against a wide range of cyber-attacks.

These and other aspects, features, and benefits of the claimed innovation(s) will become apparent from the following detailed written description of the preferred embodiments and aspects taken in conjunction with the following drawings, although variations and modifications thereto may be effected without departing from the spirit and scope of the novel concepts of the disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

Reference will now be made to the accompanying drawings, which are not necessarily drawn to scale.

FIG. 3 illustrates an exemplary security agent;

FIG. 4 illustrates an exemplary security agent;

FIG. 5 illustrates an exemplary security agent;

FIG. 6 illustrates an exemplary security agent;

FIG. 7 illustrates an exemplary security agent;

FIG. 8 illustrates an exemplary security agent;

FIG. 9 illustrates an exemplary security agent;

FIG. 10 illustrates an exemplary security agent;

FIG. 11 illustrates an exemplary security agent;

FIG. 12 illustrates an exemplary security agent;

Figure 1:
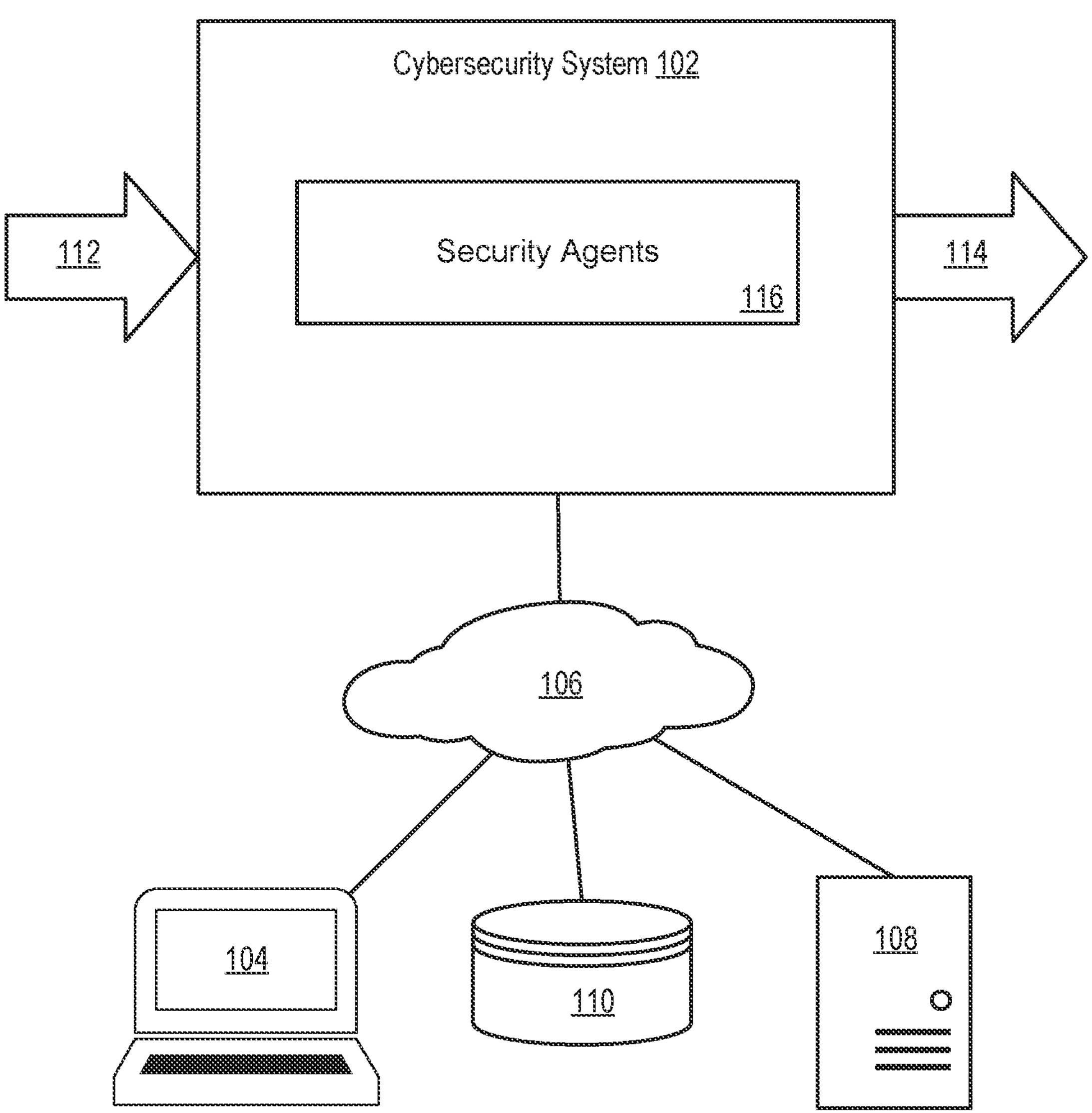
FIG. 1 illustrates an exemplary environment for a cybersecurity system.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Referring now to the figures, for the purposes of example and explanation of the processes and components of the disclosed systems and processes, reference is made to FIG. 1, which illustrates an environment 100 for a cybersecurity system 102, e.g., a comprehensive infrastructure aimed at identifying, assessing, and mitigating cybersecurity threats. The cybersecurity system 102 may perform threat detection and response by providing comprehensive monitoring of network activity, employing specialized agents for targeted threat detection, executing rapid automated responses to incidents, offering centralized management for oversight, and continuously adapting to new and evolving cybersecurity threats. This integrated approach may ensure that organizations may not only respond to current threats but also anticipate and prepare for future challenges in the cybersecurity landscape.

The cybersecurity system 102 may serve as a central hub for threat detection and response by integrating a multifaceted approach to cybersecurity within a single, cohesive framework. The cybersecurity system 102 may leverage advanced technologies and methodologies to protect against, detect, and respond to cybersecurity threats in real time. By interfacing with a wide array of data inputs (e.g., network traffic, user behavior analytics, application logs, and external threat intelligence feeds), the cybersecurity system may aggregate and synthesize data to gain a holistic view of the network's security posture and enabling it to identify anomalies, patterns, and signs of malicious activity that might indicate a threat.

Within the cybersecurity system architecture, embedded security agents 116 may be tasked with monitoring different segments of the network and endpoints. The agents may be tailored to recognize specific types of threats (e.g., malware, phishing attempts, or unauthorized access attempts) and may operate independently or in concert with each other. The distributed nature of the security agents 116 may allow for granular monitoring and rapid response to incidents anywhere within the network.

Utilizing advanced algorithms such as machine learning and heuristic analysis, the cybersecurity system 102 may continuously analyze the incoming data streams for signs of suspicious or anomalous behavior. This analysis may enable the cybersecurity system 102 to detect potential threats as they emerge, often before they can execute their payload or achieve their objective. Upon detecting a threat, the cybersecurity system 102 may be capable of executing predefined response protocols without human intervention. This could include isolating affected endpoints, blocking malicious traffic at the firewall, or revoking access credentials, thereby mitigating the threat's impact and containing the breach swiftly.

The cybersecurity system 102 may provide a centralized dashboard or interface through which cybersecurity personnel may monitor network activity, review detected threats, and manage the organization's security policies. This centralized control simplifies the management of the network's security, enables rapid decision-making in response to incidents, and facilitates the deployment of coordinated security updates across the network.

By storing incident data and outcomes, the cybersecurity system 102 may learn from past threats and responses, adapting its detection algorithms and response strategies over time. This continuous learning process ensures that the cybersecurity system 102 remains effective against evolving cybersecurity threats, enhancing defensive capabilities.

Connected to the cybersecurity system 102 may be one or more computing devices 104. The computing devices 104 may encompass a vast and varied landscape of devices integral to daily operations across both personal and professional domains. At their core, the computing devices 104 may share the commonality of incorporating a processor, enabling them to execute a plethora of tasks ranging from basic computing to complex data analysis and network communication. For example, the computing devices 104 may include personal computing devices such as desktops and laptops. Furthermore, the computing devices 104 may include mobile devices (e.g., smartphones and tablets), Internet of Things (IoT) devices (e.g., thermostats, security cameras, wearable technology such as fitness trackers and smartwatches), and/or industrial control systems (ICS) that manage critical infrastructure. These devices, though varied in function and application, may be further unified by their ability to connect to the internet, collect data, and interact with other devices and systems. The diversity and ubiquity of these devices underscore the critical need for robust cybersecurity measures to safeguard against unauthorized access and cybersecurity threats, ensuring the integrity and confidentiality of the vast amounts of data they handle and the systems they control.

The one or more computing devices 104 may be linked via a network 106, facilitating communication and data exchange across the environment 100. The network 106 may accommodate a wide array of connectivity options to cater to the diverse requirements of the computing devices and other components within the cybersecurity system 102. The network 106 may encompass wired connections, such as Local Area Networks (LAN) and Wide Area Networks (WAN), which may provide reliable, high-speed connectivity for the operation of desktop computers, servers, and industrial control systems. Wired networks, including Ethernet connections, may offer advantages of enhanced security, stable connections, and higher data transfer rates, making them suitable for environments where speed and reliability are paramount. Additionally, specialized wired networks such as fiber optic connections may be employed in scenarios demanding high bandwidth and low latency, particularly in data centers and large enterprises where vast amounts of data are transmitted swiftly across different locations.

The network 106 may integrate wireless connectivity options to support the mobility and flexibility demanded by modern computing and IoT devices. Wireless connectivity may include Wi-Fi networks, enabling laptops, smartphones, tablets, and smart devices to access the internet and internal resources without physical constraints. Other wireless technologies, such as Bluetooth and ZigBee, may facilitate short-range communication between devices, creating mesh networks for smart home applications and peripheral device connections. Moreover, cellular network technologies (e.g., 4G LTE, 5G) may further broaden the scope of the network 106, providing internet access to mobile devices and remote monitoring systems over vast distances, ensuring connectivity outside traditional network environments. By encompassing one or more wired and wireless networking technologies, the network 106 may ensure comprehensive coverage and supporting the operational needs and security considerations of a wide spectrum of computing devices 104 and applications within the environment 100.

A server 108 may function as a repository for applications and services and as a conduit for the cybersecurity system 102 to implement network-wide security policies and responses. The server 108 may be multifaceted, capable of being implemented in various forms to support a wide range of functionalities for maintaining and enhancing the security posture of the network 106. The server 108 may be a dedicated physical server located on-premises, providing centralized control and storage for the cybersecurity infrastructure. Alternatively, the server 108 may be virtualized or cloud-based, offering scalable and flexible resources to accommodate the cybersecurity system 102. This versatility may facilitate hosting a variety of security applications and services, including firewalls, intrusion detection systems, intrusion prevention systems, and antivirus software.

Functionally, the cybersecurity system 102 may utilize the server 108 to implement network-wide security policies and responses. The server 108 may process and analyze data collected from across the network, identifying potential security threats and anomalies. Based on this analysis, the server 108 may deploy automated responses to neutralize identified threats, such as isolating compromised devices or blocking malicious traffic, effectively enacting the security policies designed to protect the network and its connected devices. Moreover, the server 108 may facilitate the distribution of security updates and patches to computing devices 104 and other networked devices, ensuring that the entire ecosystem is fortified against known vulnerabilities and threats.

A database 110 may act as a storage unit for the cybersecurity system 102. The database 110 may include various implementations to suit different operational needs and security requirements. For example, the database 110 may comprise a traditional relational database for data storage and queries for analyzing threat patterns and incident response effectiveness. Alternatively, the database may comprise a NoSQL (not only structured query language) model to accommodate the unstructured data often associated with cybersecurity operations, providing flexibility and scalability for handling large volumes of data generated by network devices and user computers. For enhanced accessibility and redundancy, the database may be cloud-based, ensuring data is securely stored off-site and accessible from multiple locations, facilitating disaster recovery and remote access for analysis.

As a storage unit for the cybersecurity system 102, the database 110 may store an array of data for informed security decision-making and policy implementation. The stored data may include detailed threat intelligence, which may encompass indicators of compromise, patterns of known malware, and tactics, techniques, and procedures used by cyber adversaries. The stored data may be used by the cybersecurity system 102 for proactive threat detection and prevention strategies. Historical incident data stored within the database 110 may offer insight into past security breaches or attempted attacks, enabling the cybersecurity system 102 to analyze trends, identify potential vulnerabilities within the network, and refine detection algorithms based on empirical evidence. Additionally, the database 110 may store configuration settings for security tools and network devices, ensuring a consistent and optimized security posture across the entire network infrastructure. Through storing and managing this diverse set of data, the database 110 may support the cybersecurity system 102 in developing a dynamic and responsive security framework that adapts to new threats while learning from past encounters, thereby enhancing the overall resilience of the network 106 against cyber-attacks.

Inputs 112 into the cybersecurity system 102 may provide a comprehensive overview of the network's operational and security status. The inputs 112 may originate from a variety of sources within the network infrastructure and beyond, encompassing real-time network activity data, user behavior analytics, and external threat intelligence feeds. Real-time network activity data may include logs and alerts from firewalls, routers, and other network devices, offering immediate insights into traffic patterns, potential unauthorized access attempts, and other security-related events. This real-time network activity may enable the cybersecurity system 102 to detect and respond to incidents as they occur, minimizing potential damage.

The inputs 112 may comprise user behavior analytics including analysis of user activities and behaviors. The cybersecurity system 102 may utilize the user behavior analytics to identify compromised user accounts or insider threats, e.g., identifying deviations that may suggest a security threat, such as unusual login times or locations, and access to sensitive resources not typically used by a user. External threat intelligence feeds may further enrich the capabilities of the cybersecurity system 102 by providing updated information on new vulnerabilities, ongoing cyber-attack campaigns, and indicators of compromise. External threat intelligence may be received from one or more of cybersecurity research organizations, industry consortia, and government agencies, offering a global perspective on cybersecurity threats that could potentially affect the network.

By integrating these varied inputs 112, the cybersecurity system 102 may be equipped to continuously monitor the environment 100 for potential security breaches or anomalies. This comprehensive monitoring approach may allow for the early detection of threats, enabling proactive measures to prevent breaches and minimize the impact of cyber-attacks. Through the aggregation and analysis of data from multiple sources, the cybersecurity system 102 may identify patterns and correlations that might be missed when considering each data source in isolation, thereby enhancing the effectiveness of the network's cybersecurity defenses.

Outputs 114 from the cybersecurity system 102 may facilitate swift and informed responses to detected security threats, ensuring that the environment 100 remains robust against potential cyber-attacks. The outputs 114 may manifest in several forms, each of which may be tailored to specific roles within the cybersecurity workflow to maximize the effectiveness of the defensive strategies of the cybersecurity system 102. Actionable insights may represent a category of outputs, providing detailed analyses and recommendations based on monitoring and threat detection. These actionable insights may guide strategic decision-making, helping to strengthen the network's security posture over time.

Outputs 114 may further comprise alerts to security personnel, ensuring potential threats are immediately reported. These alerts may vary in format, from emails and short message service (SMS) messages to dashboard notifications and may convey the urgency and nature of the detected threat succinctly, enabling rapid assessment and response by cybersecurity personnel. To increase efficiency, alerts may be prioritized based on the severity and potential impact of the threat, ensuring that critical issues are addressed promptly.

Cybersecurity system 102 may communicate critical information and insights to security personnel, thereby maintaining a robust defense against cyber threats. For example, the cybersecurity system 102 may include a user interface (e.g., presented by a display of the one or more computing devices 104) providing security personnel with detailed, real-time information about detected threats. The user interface may display one or more of nature of the threat, severity of the threat, and/or comprehensive data surrounding each incident. Security personnel may access one or more of detailed threat timelines, affected system profiles, and potential impact assessments, e.g., within a single, intuitive dashboard. The user interface may provide swift orientation in the face of security alerts and may facilitate fast and informed decision-making.

The user interface may integrate contextual data associated with the environment 100. Moreover, context provided with each alert may be enriched by integrating a broad range of data from the environment 100. Contextual data may include, but is not limited to, network traffic patterns, user access logs, system health data, and outputs from intrusion detection systems. Additionally, the cybersecurity system 102 may communicate with external threat intelligence databases to compare and contrast the detected activities with known threat behaviors. This integration may provide a comprehensive overview of each incident and offer predictive insights, anticipating potential future attacks based on current threat dynamics.

Periodic reports may be generated by the cybersecurity system 102. The periodic reports may be used by security personnel for ongoing security monitoring and strategic planning. The periodic reports may provide summaries of detected threats, incident outcomes, and/or system efficacy over time. According to some aspects, a report may include one or more of statistical analyses, trend identification, and performance metrics associated with cybersecurity measures. This feedback loop may enhance capabilities of security personnel to adjust tactics, refine protocols, and optimize overall security posture in alignment with evolving cybersecurity landscapes.

Enhancing the capabilities of the cybersecurity system 102, generative AI may be employed to produce detailed, human-readable explanations for the results of investigations and decision-making processes. The generative AI may analyze vast amounts of data to generate narratives that explain the reasoning behind each security alert and the actions taken in response. These AI-generated explanations may demystify complex cybersecurity events, making them accessible and understandable to all members of the security team, regardless of their technical background. The explanations may aid in immediate threat response and/or may be used in training and educating personnel on the subtleties of cyber threat management.

Outputs 114 may include automated response commands to network infrastructure, where the cybersecurity system 102 may initiate determined or predefined protective measures without the need for manual intervention. These protective measures may include isolating compromised devices, blocking suspicious internet protocol (IP) addresses at a firewall, automatically applying security patches to vulnerable systems, dynamically adjusting access control lists to limit user permissions based on detected threat levels, and/or initiating secure backup protocols to preserve data. Such automated responses may contain and mitigate threats in real-time, significantly reducing the window of opportunity for cyber attackers to exploit vulnerabilities. Moreover, the list of protective measures described herein is not exhaustive. The cybersecurity system 102 may be equipped to initiate additional or alternative protective measures as required by the evolving dynamics of detected threats and the security requirements of the environment 100. Therefore, one or more other protective measures may be employed by the cybersecurity system 102 to ensure robust defense and resilience against cyber threats.

Together, outputs 114 may form a comprehensive response mechanism, enabling the cybersecurity system 102 to not only detect and analyze threats but also to enact measures to mitigate them effectively. By combining detailed insights with immediate, automated actions, the cybersecurity system 102 may ensure that security personnel are equipped with the information and tools needed to protect the network, while also leveraging technology to take swift protective actions. This multifaceted approach may ensure that the cybersecurity system 102 may respond dynamically to evolving threats, safeguarding the integrity and confidentiality of the network and its data.

Security agents 116 within the cybersecurity system 102 may be specialized software components tasked with various functions such as monitoring network traffic for suspicious patterns, analyzing user activities for deviations from the norm, and enforcing security protocols. These security agents 116 may operate both independently and collaboratively, leveraging machine learning algorithms and heuristic analysis to improve detection accuracy and response times.

Security agents 116 within the cybersecurity system 102 may be versatile and dynamic, comprising software components for performing a wide array of security-related functions tailored to safeguarding the network from diverse cybersecurity threats. The security agents 116 may be deployed across the network infrastructure, including on endpoints, within the network core, and on servers, to provide comprehensive coverage. Implementations of the security agents 116 may vary significantly depending on their designated functions. For instance, some security agents 116 may be designed to monitor network traffic continuously, employing sophisticated algorithms to identify suspicious patterns that may indicate malicious activity, such as data exfiltration attempts or unauthorized access. Other security agents 116 may specialize in analyzing user activities, looking for deviations from established norms that may suggest a compromised account or insider threat, such as unusual login times or access to sensitive data outside of normal job functions.

Furthermore, security agents 116 may be tasked with enforcing security protocols, automatically implementing policies like access controls, application whitelisting, and encryption to protect data integrity and confidentiality. To enhance their effectiveness, security agents 116 may operate both independently, providing localized protection and response capabilities, and collaboratively, sharing insights and data with other agents to form a cohesive and unified defense strategy. This collaborative approach may allow for a more nuanced understanding of the network's security posture, enabling the identification of complex multi-stage attack patterns that might not be evident when considering data from a single point in the network.

Leveraging advanced technologies such as machine learning algorithms and heuristic analysis, security agents 116 may significantly improve detection accuracy and reduce response times. Machine learning may enable the agents to learn from past incidents, adapting their detection mechanisms to evolving threats, while heuristic analysis may allow for the identification of unknown threats based on behaviors and characteristics common to malicious activities. Through this combination of independent and collaborative operations, backed by advanced analytical technologies, security agents 116 within the cybersecurity system 102 may offer a dynamic and adaptive layer of defense that enhances the network's resilience against cybersecurity threats, ensuring swift detection and mitigation to protect the network and its data.

Together, these elements may form an integrated cybersecurity defense mechanism, where computing devices 104 and network infrastructure may be continuously monitored and protected against emerging cybersecurity threats through the coordinated efforts of the cybersecurity system 102, its server 108, database 110, and the deployment of security agents 116. This environment 100 may exemplify a proactive and dynamic approach to cybersecurity, emphasizing early detection, rapid response, and continuous learning from past incidents to fortify network defenses.

Figure 2:
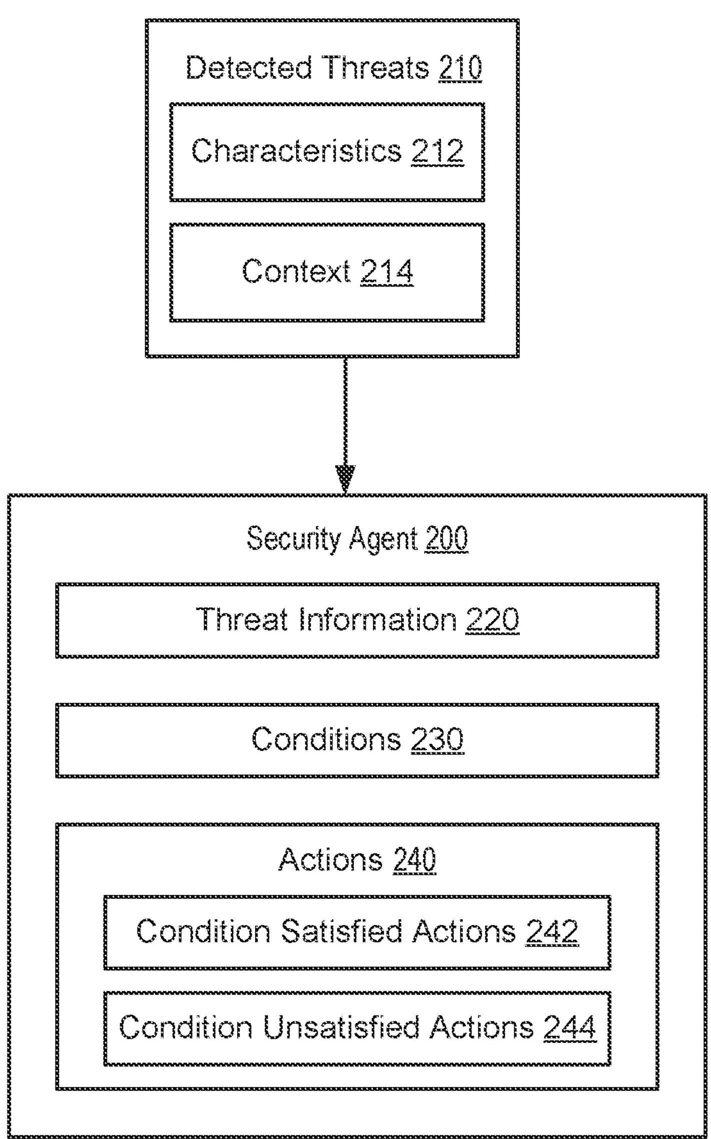
FIG. 2 illustrates an exemplary security agent.

As shown in FIG. 2, a security agent 200 may facilitate threat identification, assessment, and remediation (e.g., within the cybersecurity system 102 illustrated in FIG. 1). The security agent 200 may proactively and autonomously address cybersecurity threats, enhancing the overall security posture of the network it protects. The security agent 200 may receive a variety of detected threats 210 via the network 106. Upon detection of a threat 210, the security agent 200 may assess the threat based on threat information 220 and one or more conditions 230 (e.g., received from database 110).

Moreover, the security agent 200 may utilize one or more techniques comprising artificial intelligence for threat identification, assessment, and remediation. These AI-enhanced decision processes may improve the efficiency and effectiveness of the security agent 200 in addressing detected threats 210 and may contribute to a proactive security posture that may anticipate and neutralize detected threats 210 before they may cause significant damage. For example, machine learning and deep learning algorithms may analyze complex data patterns and make predictive judgments that may adapt to the evolving landscape of cyber threats.

By integrating machine learning, the security agent 200 may continuously learn from historical security data and real-time network activity to improve its threat detection and response strategies. The security agent 200 may identify subtle anomalies that may indicate sophisticated cyberattacks, which may be undetectable with rule-based systems. For instance, the security agent 200 may utilize unsupervised learning models to cluster similar network behaviors and identify outliers that could represent potential threats.

Deep learning techniques may be applied by the security agent 200 to process vast amounts of unstructured data, such as network traffic logs and user behavior data, to detect complex patterns and correlations that may be missed by human analysts or simple models. For example, security agent 200 may utilize neural networks to analyze payload binaries for malware detection or to understand command sequences in network traffic that may indicate a coordinated attack. The security agent 200 may employ reinforcement learning to dynamically adapt its decision-making processes based on the outcomes of previous actions. This adaptation may allow the security agent 200 to optimize its response strategies over time, e.g., reducing false positives and enhancing response accuracy. For example, if a particular response strategy successfully mitigates a type of network intrusion, the agent may learn to apply similar strategies under comparable conditions in the future.

The detected threats 210 may include one or more of a broad spectrum of potential cyber risks identified within a network environment, encompassing any number of malicious activities aimed at compromising integrity, availability, or confidentiality of the network and its data. The detected threats 210 may include, but are not limited to, malware infections such as viruses, worms, and Trojan horses, which may damage data, steal sensitive information, or gain unauthorized access to network resources. Phishing attempts, which may deceive users into disclosing personal or financial information, may represent another threat, as do ransomware attacks that encrypt data and demand payment for its release. Advanced persistent threats, characterized by their stealth and persistence, may pose a significant risk by remaining undetected within a network for extended periods, enabling long-term espionage or data exfiltration. Denial of Service (DoS) and Distributed Denial of Service (DDoS) attacks, aimed at overwhelming network resources to disrupt service, may further exemplify the variety of threats comprised by the detected threats 210.

Indications of the detected threats 210 may be received by the security agent 200 through one or more mechanisms associated with the complex landscape of cybersecurity threat detection. For example, the detected threats 210 may be sourced from one or more of intrusion detection systems (IDS) or intrusion prevention systems (IPS), which may monitor network traffic for suspicious patterns or known signatures of malicious activity. Endpoint protection platforms (EPP), including antivirus and anti-malware solutions, may provide alerts on detected threats 210 at individual workstations or servers. Additionally, security information and event management (SIEM) systems, which may aggregate and analyze log data from various sources across the network, may offer comprehensive insights into potential security incidents, enabling the security agent to respond to complex threats more effectively.

The security agent 200 may further receive one or more characteristics 212 of each detected threat 210 and a context 214 within which the detected threats 210 operate. The characteristics 212 of the detected threats may include one or more attributes, including the threat's type (e.g., malware, ransomware, phishing), its severity, propagation mechanisms, targeted vulnerabilities, and/or behavioral patterns such as data exfiltration activities or encryption of files. These attributes may provide a detailed profile of the threat, enabling the security agent 200 to assess its potential impact and to strategize an effective mitigation or containment approach.

The context 214 within which a detected threat 210 operates may include one or more environmental and/or situational factors that may influence a behavior or as impact of the detected threat 210. The context 214 may include the current network security posture, such as the deployment of firewalls, intrusion detection systems, and endpoint protection, as well as the presence of security patches and updates. Alternatively, or in combination, the context 214 may include one or more of the specific systems or data targeted by the detected threat 210, the time of detection (e.g., relative to business hours), and any concurrent events or threats that may compound the risk or impact of the detected threat.

The reception of information about the characteristics 212 and context 214 of threats may be facilitated through a variety of mechanisms. One or more of intrusion detection systems, antivirus software, and endpoint detection and response may identify and detail the characteristics of threats by analyzing network traffic, system behaviors, and file attributes. These systems may detect anomalies that signify a threat, classify the type of threat based on its behavior or signature, and/or provide real-time alerts associated with the characteristics 212.

The context 214 within which a detected threat 210 operates may be derived from one or more of network monitoring tools, system logs, and security information and event management (SIEM) platforms. These tools may aggregate and/or analyze data from across the network and its connected devices, offering insights into the security environment's current state, identifying vulnerable or targeted assets, and/or highlighting operational conditions that may affect the threat's impact or propagation.

By integrating data on both the characteristics 212 of detected threats 210 and the context 214, the security agent 200 may gain a comprehensive understanding of each threat scenario. This integrated approach may enable the security agent 200 to deploy responses that are not only based on the nature of the threat itself but also tailored to the specific environmental and situational factors. The dynamic interplay between the detailed threat profiles and their operational context may ensure that responses are both effective in mitigating immediate risks and strategic in reinforcing the network's overall security posture against future incidents.

The threat information 220 may include data regarding each detected threat 210, such as historical data detailing previous occurrences of similar threats within the network, e.g., offering insights into patterns or trends that may inform the current threat response strategy. Moreover, the threat information may include persistence information indicating whether a threat has exhibited the ability to maintain a presence within the network over time, which may be particularly relevant for identifying and neutralizing advanced persistent threats (APTs). Additionally, a detailed description of the detected threat 210 may provide a comprehensive overview of the threat's nature, scope, potential impact, and known mitigation strategies.

Moreover, threat information 220 may include information from one or more external threat intelligence feeds. The threat intelligence feeds may supply real-time updates on new vulnerabilities, emerging attack vectors, and indicators of compromise (IoCs), which are essential for keeping the security agent abreast of the evolving cyber threat landscape. For example, the threat information 220 may include details on newly discovered malware signatures, techniques used in recent phishing campaigns, or intelligence about command and control (C&C) servers associated with known cybercriminal groups. By incorporating the threat information 220, the security agent 200 may react to existing threats and proactively anticipate potential future attacks.

Indications of detected threats 210 may be transmitted to the security agent 200 through various mechanisms which may capture and communicate anomalous activities indicative of cybersecurity risks. The mechanisms may include alerts from intrusion detection and prevention systems, which may monitor network and system activities for malicious actions or policy violations. Endpoint detection and response (EDR) solutions may flag suspicious behavior on individual devices, while security information and event management (SIEM) systems aggregate and analyze log data from across the network to identify potential security incidents. Together, these sources of threat indications, combined with context provided by the threat information 220, may enable the security agent to assess each threat, facilitating informed decision-making regarding threat mitigation and response efforts.

The conditions 230 may comprise conditional logic that enables the security agent 200 to evaluate the complexities and nuances of detected threats 210, their characteristics 212, the context 214 within which they operate, and the threat information 220. The conditions 230 may comprise one or more conditional statements (e.g., grounded in conditional logic), to accurately determine the nature, severity, and/or potential impact of each threat. According to some aspects, conditions 230 may assess the characteristics 212 of the detected threats 210, such as the method of entry, the type of payload, the target of the attack (e.g., specific data or systems), and/or the behavior exhibited within the network. This assessment may categorize threats based on their potential damage, enabling the security agent to prioritize responses accordingly.

Another aspect may evaluate the context 214 within which the detected threats operate. This evaluation may include consideration of one or more of the current security posture of the network, the vulnerability status of affected systems (e.g., whether they are patched against known vulnerabilities), the time of detection (e.g., during peak business hours or off-hours), and any relevant external factors (such as an ongoing widespread attack campaign). Accordingly, the context 214 may allow the security agent 200 to assess the broader implications of the threat beyond its immediate impact.

Conditions 230 may comprise conditional logic to compare the detected threats 210 against the threat information 220, which may include up-to-date intelligence on new vulnerabilities, attack vectors, and indicators of compromise (IoCs). The comparison may reveal if a detected threat exploits a newly discovered vulnerability, is part of an emerging trend in cyber attacks, or matches the signature of known malware, influencing the urgency and methods of response. Furthermore, conditions 230 may encompass conditional statements that trigger based on the aggregation of characteristics 212, context 214, and threat information 220, to implement complex decision-making protocols. For example, a condition may specify that if a threat is identified with high-risk characteristics, within a sensitive operational context, and matches critical threat intelligence indicators, then the threat may be escalated immediately for human intervention (e.g., by a network administrator). If a threat is low risk, occurs in a less critical context, and is well-documented in threat information databases, automated mitigation measures may be implemented.

Based on the evaluation of threat information 220 against the conditions 230, the security agent 200 may execute one or more of actions 240. These actions may include one or more condition satisfied actions 242 and/or one or more condition unsatisfied actions 244, enabling a flexible and nuanced approach to threat management based on the evaluation of conditions 230 associated with each threat.

Condition satisfied actions 242 may be executed when a threat is verified or when the risk posed by a detected activity is deemed significant. The condition satisfied actions 242 may include immediate mitigation or neutralization of the threat to prevent any potential damage. Examples of condition satisfied actions 242 may include automatically isolating the affected endpoint from the network to stop the spread of malware, blocking IP addresses or domains associated with the threat at the firewall level, executing scripts to remove malware or reverse unauthorized changes, and/or triggering updates or patches to vulnerable software. In more severe cases, condition satisfied actions 242 may include shutting down critical systems to prevent catastrophic data breaches or activating emergency communication protocols to alert IT and cybersecurity teams for rapid intervention. Additionally, the condition satisfied actions 242 may comprise one or more of triggering a backup of data (e.g., before or after a potential compromise), or recovering a backup to restore system integrity (e.g., after an attack). Further condition satisfied actions 242 may include reconfiguring network security parameters (e.g., to strengthen defenses) or initiating automated forensic tools to analyze the breach and gather evidence for further security enhancement.

Condition unsatisfied actions 244 may be taken when the detected activity is assessed as posing no significant risk, or when there is insufficient evidence to classify an activity as a genuine threat. The condition unsatisfied actions 244 may be generally less invasive (e.g., relative to the condition satisfied actions 242), such as focusing on monitoring or logging rather than immediate containment or eradication. Condition unsatisfied actions 244 may include logging the detected activity for future analysis, setting up alerts for further occurrences of similar activities to gather more evidence, and disregarding or whitelisting activities proven to be benign after thorough investigation. In some instances, condition unsatisfied actions 244 may include notifying relevant personnel for a manual review of the detected activity, ensuring that potential threats are not overlooked due to a lack of immediate evidence. Additionally, the condition unsatisfied actions 244 may comprise one or more of triggering a backup of data (e.g., as a precautionary measure), or recovering a previous state of the system to ensure integrity before continuing operations. Moreover, the condition unsatisfied actions 244 may include adjusting detection thresholds or parameters (e.g., to refine the sensitivity of future alerts), thereby enhancing the accuracy of threat assessments without overly burdening the system with false positives.

The decision to execute either condition satisfied actions 242 or condition unsatisfied actions 244 may be made based on an analysis of the threat's characteristics, its context within the network environment, and the broader threat landscape. This decision-making process may allow the security agent 200 to balance the need for rapid response to genuine threats with the importance of minimizing disruptions to network operations and avoiding false positives. By distinguishing between conditions that warrant immediate action and those that require further observation or analysis, the security agent 200 may ensure that network resources are allocated efficiently, enhancing the overall security posture without compromising operational effectiveness.

The security agent 200 may adapt its response based on characteristics 212 of each detected threat 210 and a context 214 within which the detected threat 210 operates. By integrating intelligence from multiple sources analyzing each situation, the security agent 200 may enhance the ability of the cybersecurity system 102 to protect the network 106 and its associated components from a wide array of cybersecurity threats. This strategic approach may ensure that the cybersecurity system 102 remains both resilient and responsive, capable of autonomously mitigating threats in real-time and reducing the window of exposure to potential cyber-attacks.

The following examples of agents may represent a spectrum of automated cybersecurity measures tailored to address specific types of threats (e.g., phishing and adware). Moreover, the examples may include one or more of observation, decision-making based on the progression of the threat, and appropriate action based upon condition evaluation.

Figure 3:
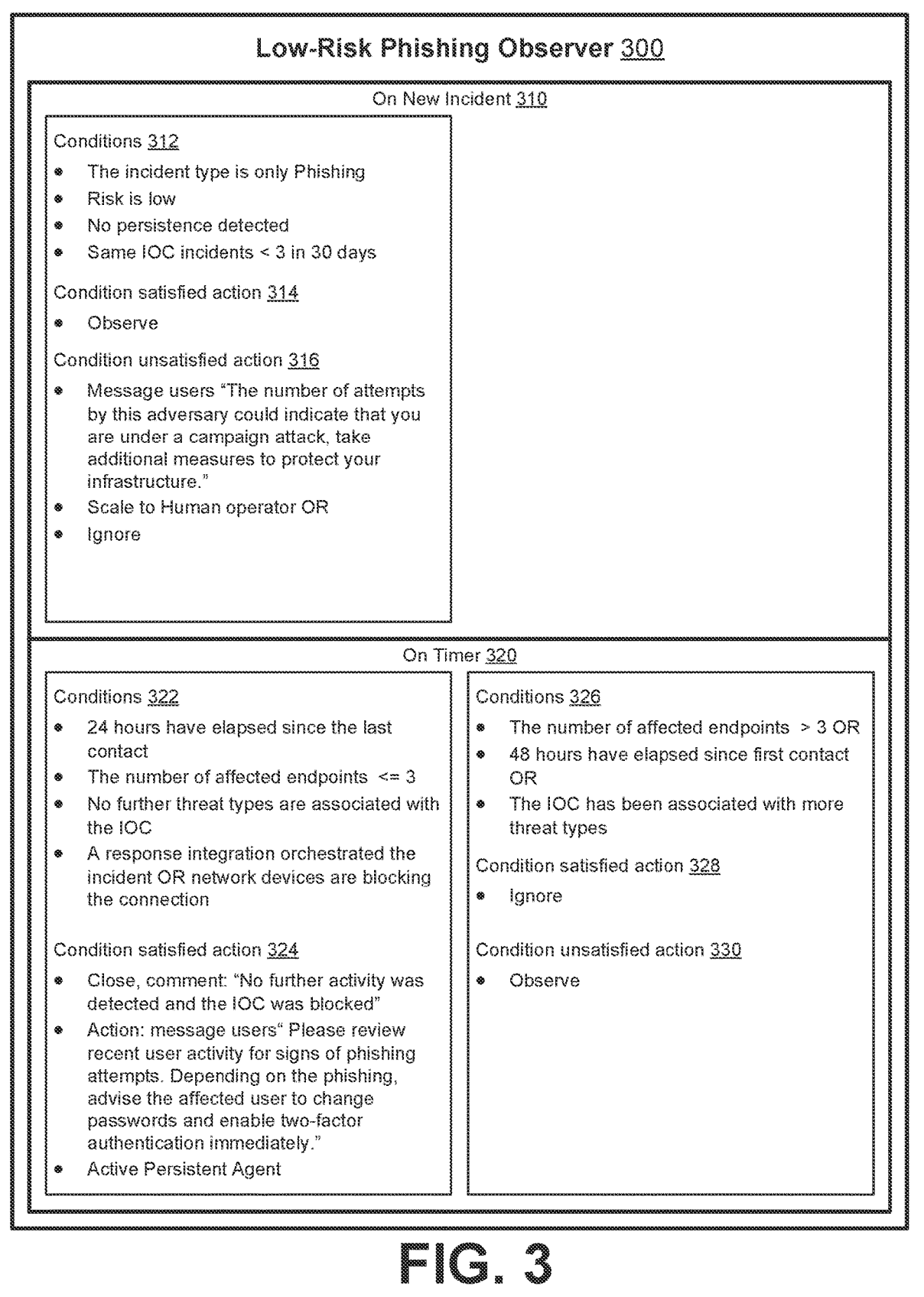

Example 1 (e.g., illustrated in FIG. 3), termed as a Low-Risk Phishing Observer 300, may monitor low-risk phishing events within the network. Low-Risk Phishing Observer 300 may identify phishing incidents that, while potentially harmful, are classified as low-risk based on predefined criteria including incident type, risk level, persistence detection, and the frequency of similar incidents over a recent period.

Upon detecting a new phishing incident (e.g., On New Incident 310), Low-Risk Phishing Observer 300 may evaluate the phishing incident against conditions 312: the incident must be exclusively related to phishing, classified as low-risk, show no signs of persistence, and there must be fewer than three incidents involving the same Indicator of Compromise (IOC) within the last 30 days. If these conditions are met, the Low-Risk Phishing Observer 300 adopts an observation stance (e.g., condition satisfied action 314), closely monitoring the incident for any evolution or escalation. If the conditions are not fully satisfied, indicating a potential underestimation of the threat's severity or an increase in the phishing campaign's intensity, the Low-Risk Phishing Observer 300 may take several actions (e.g., condition unsatisfied action 316). These actions include issuing warnings to users about the potential for a campaign attack and advising on protective measures, escalating the incident to a human operator (e.g., a network administrator) for further investigation, or choosing to ignore the incident if it is deemed non-threatening beyond its initial assessment.

The Low-Risk Phishing Observer 300 also employs a time-based evaluation mechanism (e.g., On Timer 320), where conditions (e.g., conditions 322) are reassessed 24 hours after the last detected contact related to the phishing incident. If within this timeframe, the incident remains isolated to three or fewer endpoints, no additional threat vectors are identified, and either response mechanisms have been activated or network defenses are blocking further contacts, the agent proceeds to close the incident (e.g., condition satisfied action 324). This closure is accompanied by a note indicating no further activity was observed and that the IOC was blocked, alongside a message to users prompting a review of recent activities for phishing signs and recommending security measures like password changes and the activation of two-factor authentication. This approach underscores the agent's proactive stance in not just countering the immediate threat but also bolstering user awareness and defensive behaviors.

The response may shift should the situation escalate (e.g., conditions 326), evidenced by more than three affected endpoints, the lapse of 48 hours since the initial contact without resolution, or the association of the IOC with additional threat types. The Low-Risk Phishing Observer 300 opts to ignore the conditions previously set for closure (e.g., condition satisfied action 328), indicating the situation might warrant more nuanced or intensive intervention, yet continues to observe the incident (e.g., condition unsatisfied action 330), reflecting a careful balance between automated oversight and the need for potential human intervention (e.g., by a network administrator) in more complex or persistent threat scenarios.

Example 2 (e.g., illustrated in FIG. 4), termed as a Low-Risk Phishing Observer 2 400, may monitor and respond to low-risk phishing incidents. This agent may operate under a low priority, focusing on phishing events that do not pose immediate or high threats to the network's integrity. Upon detection of a new phishing incident (e.g., On New Incident 410), Low-Risk Phishing Observer 2 400 may evaluate the situation based on predefined conditions. These conditions (e.g., Conditions 412) include assessing whether the incident is solely related to phishing, the risk level is low, no persistence of the threat is detected, and the same Indicator of Compromise (IOC) has been involved in less than three incidents within a 30-day period. If these conditions are met, the agent's condition satisfied action 416 is to observe the incident.

If the conditions are not satisfied (e.g., indicating a potential for increased risk or the involvement of the same IOC in multiple incidents), the Low-Risk Phishing Observer 2 400 may take several condition unsatisfied actions 416. These actions may range from sending messages to users alerting them of a possible campaign attack and advising on protective measures, to escalating the issue to human operators (e.g., network administrators) for further review, or choosing to ignore the incident based on specific criteria.

The Low-Risk Phishing Observer 2 400 may also incorporate a timer mechanism (e.g., On Timer 420) to re-evaluate the incident after 48 hours from the first contact. During this re-evaluation (e.g., Conditions 422), the Low-Risk Phishing Observer 2 400 may check for any further contacts, the number of affected endpoints, association with other threat types, and whether a response integration or network devices have orchestrated the incident or are blocking the connection. If no further activities are detected and the threat remains low, the agent may take the condition satisfied action 424 to close the incident, with a comment for future monitoring and advisories for users on precautionary measures.

If the conditions indicate an escalation in threat (e.g., Conditions 42/), such as an increase in the number of affected endpoints or association with additional threat types, the Low-Risk Phishing Observer 2 400 may decide to continue observing the incident without taking immediate action to close it (e.g., condition satisfied action 428 or condition unsatisfied action 430). This approach allows for dynamic response based on the evolving nature of the threat landscape, ensuring that low-risk incidents are managed efficiently while conserving resources for more critical threats.

Example 3 (e.g., illustrated in FIG. 5), termed as a Low-Risk Phishing Observer 3 500, may manage and mitigate low-risk phishing threats through a vigilant observation process and an adaptive response mechanism based on the decay of threat indicators over time. Operating with a low priority, this agent may initiate its protocol upon the detection of new phishing incidents (e.g., On New Incident 510), applying a set of conditions 512 to evaluate the threat. These conditions include verifying that the incident solely involves phishing, the risk associated with the incident is low, there is no evidence of persistent threats, and the same Indicator of Compromise (IOC) has been implicated in fewer than three incidents within a 30-day timeframe. When these conditions are met, the agent's response is to observe the incident without taking immediate action (e.g., condition satisfied action 514).

Should the incident fail to meet these specific conditions, suggesting a potentially higher risk or more complex threat landscape, the agent may take condition unsatisfied action 516. These actions range from sending cautionary messages to users about potential campaign attacks and urging protective measures, to escalating the incident for human intervention (e.g., by a network administrator), or opting to disregard the incident based on additional intelligence or lack thereof.

As part of its ongoing monitoring, the agent re-evaluates the threat (e.g., conditions 522) based on a timer condition (e.g., on timer 520) that takes into account whether the IOC has been marked as a false positive or a specific amount of time has elapsed (e.g., 20 days in this instance). Additional considerations for this reassessment may include the number of affected endpoints remaining low, no new threat types being associated with the IOC, the frequency of contacts post-initial detection, and whether any responsive actions or network device interventions have been orchestrated. Should these timer-based conditions be satisfied, indicating no further malicious activity and adherence to the decay criteria, the agent proceeds with a condition satisfied action 524 to close the incident. This closure is accompanied by a notation highlighting the decay date and a communication to users for continued vigilance and recommended security measures.

If upon timer assessment, the threat appears to have escalated, e.g., evidenced by an increase in affected endpoints or the association of the IOC with additional threat types (e.g., conditions 526), the agent opts to either ignore the incident due to insufficient risk justification (e.g., condition satisfied action 528) or continue its observation stance (e.g., condition unsatisfied action 530), awaiting further developments or evidence that could necessitate a change in response. This dynamic approach allows security agent 200 to effectively manage low-risk phishing threats by balancing proactive monitoring with responsive actions tailored to the evolving cybersecurity environment.

Example 4 (e.g., illustrated in FIG. 6), termed as a Low-Risk Phishing Observer 600, may oversee incidents classified as low-risk phishing attacks. This agent may specifically coordinate with another agent for data collection, highlighting its integration within a broader cybersecurity infrastructure.

Upon encountering a new phishing-related incident, Low-Risk Phishing Observer 600 may initiate a detailed review process, adhering to a set of conditions 612 that include confirming the incident solely pertains to spam, the assessed risk level is low, no persistent threats have been identified, and the same Indicator of Compromise (IOC) has been cited in fewer than three incidents within the past 30 days. When these criteria are satisfied, the agent opts for a monitoring approach (e.g., condition satisfied action 614), placing the incident under observation without immediate further action.

Should these conditions not be met, e.g., indicating a potentially higher risk scenario or a deviation from the established parameters, the agent may undertake several condition unsatisfied actions 616. These actions may include issuing alerts to users about the possibility of a concerted campaign attack and suggesting enhanced security measures, referring the incident to human operators (e.g., network administrators) for deeper analysis, or choosing to disregard the incident based on the lack of significant threat indicators.

The Low-Risk Phishing Observer 600 also incorporates a timer function (e.g., on timer 520) to reassess the incident after a 24-hour period has elapsed since the last noted contact. This reassessment is contingent upon a series of conditions 622 being evaluated, such as the number of affected endpoints remaining below a threshold of three, no additional threat types being linked to the IOC, and the original connection being facilitated through a browser or Endpoint Detection and Response (EDR) system. Furthermore, the conditions consider whether a response has been orchestrated by the cybersecurity infrastructure or if network devices have successfully blocked the connection attributed to the IOC. If these reassessment criteria point towards no further malicious activity or escalation in threat level, the agent proceeds with a condition satisfied action 524 to formally close the incident. This closure is annotated with a comment emphasizing the blockade of the IOC and is accompanied by a directive to users to vigilantly review recent activities for signs of phishing attempts, alongside recommendations for security best practices.

In situations (e.g., conditions 526) where the post-timer evaluation reveals an expansion in the number of affected endpoints, the passage of 48 hours since the initial contact without resolution, or an association of the IOC with additional threat vectors, the agent may choose to either disregard these findings due to insufficient risk (e.g., condition satisfied action 528) or maintain its observational stance (e.g., condition unsatisfied action 530). This operational flexibility allows the Low-Risk Phishing Observer 600 to dynamically adjust its response based on the evolving nature of detected phishing incidents, ensuring an effective balance between proactive threat monitoring and the efficient allocation of cybersecurity resources towards more pressing or high-risk threats.

Example 5 (e.g., illustrated in FIG. 7), termed as a Low-Risk Persistence Observer 700, may monitor previously closed low-risk incidents, such as those categorized under phishing, spam, or adware. It operates with a low priority and is specifically designed to assess the potential for persistence of threats within a 48-hour window post-closure, ensuring that seemingly benign incidents do not evolve into more severe threats.

Upon identification of a new incident fitting its monitoring criteria, the Low-Risk Persistence Observer 700 evaluates the incident based on conditions 712. These include determining whether the incident falls within the phishing, spam, or adware categories, the associated risk level is deemed low, and whether any similar incidents have been closed in the last 48 hours. If these conditions align, the agent's initial course of action (e.g., condition satisfied action 714) is to observe the incident, maintaining vigilance over the potential re-emergence or escalation of the threat.

Should the incident not meet these initial evaluation criteria, e.g., indicating it may not conform to the typical low-risk profiles the Low-Risk Persistence Observer 700 is tasked with monitoring, the agent's response is to disregard the incident (e.g., condition unsatisfied action 716), focusing its resources on incidents that align more closely with its designated observation parameters.

As part of its operational protocol, the Low-Risk Persistence Observer 700 utilizes a timer (e.g., On Timer 720) to reassess the situation 48 hours after the last noted contact with the incident. This reassessment involves a set of conditions 722 that include checking for any new Command and Control (C&C) incidents, new malware download activities, or any new incidents related to malware that are linked to the endpoints originally affected. If such indicators are detected, suggesting a resurgence or persistence of the threat, the Low-Risk Persistence Observer 700 then takes a proactive stance. Its satisfied action (e.g., condition satisfied action 724) involves changing the status of the new incident to "Open Pending" with a comment indicating a potential link to the previously observed Indicator of Compromise (IOC). Additionally, it adjusts the persistence status to "YES" for the related endpoints, signaling an elevated concern for these areas.

If this subsequent evaluation does not reveal any further suspicious activities or threats linked to the endpoints in question, the agent opts for an unsatisfied action (e.g., condition unsatisfied action 726) to disregard the incident. This decision is based on a lack of evidence to suggest ongoing or escalating threat activity, allowing the agent to conserve resources and attention for incidents showing clear signs of persistence or worsening conditions.

Through its methodical approach to monitoring and reassessment, the Low-Risk Persistence Observer 700 ensures that incidents initially classified as low-risk are not prematurely dismissed, providing an essential safety net to catch and address potential threats that may not have been fully neutralized or could evolve into more serious concerns over time.

Example 6 (e.g., illustrated in FIG. 8), termed as a Low-Risk Spam Observer 800, may manage incidents identified as low-risk spam within a cybersecurity system. Operating with a low priority, this agent is designed to streamline the response to spam incidents that pose minimal immediate risk to the network's security, ensuring resources are allocated efficiently across the cybersecurity operation.

Upon the detection of a new spam incident, Low-Risk Spam Observer 800 initiates an assessment based on a set of conditions 812. These conditions require the incident to be exclusively related to spam, categorized under low risk, with no detected persistence, and involve an Indicator of Compromise (IOC) that has appeared in less than three incidents within the last 30 days. If an incident meets these criteria, the agent opts for a monitoring approach (e.g., condition satisfied action 814), placing the incident under observation without immediate further intervention. This decision reflects the agent's role in prioritizing cybersecurity resources by focusing attention on incidents that may escalate in severity or demonstrate significant risk.

Should the incident not conform to these initial criteria, e.g., suggesting a potential escalation or a broader campaign attack, the Low-Risk Spam Observer 800 may undertake condition unsatisfied action 816. These include issuing alerts to users regarding the potential scale of the attack and advising on protective measures, escalating the incident to human operators (e.g., network administrators) for further analysis, or choosing to disregard the incident based on a lack of significant threat factors.

Additionally, Low-Risk Spam Observer 800 employs a timer (e.g., On Timer 820) to reassess the situation 24 hours after the initial identification of the incident. This reassessment evaluates whether there has been any further activity, the number of affected endpoints remains below a threshold of three, no additional threat types have been associated with the IOC, and whether the incident has been effectively managed through response integration or by network devices blocking the connection. If these conditions (e.g., conditions 822) indicate no further malicious activity, the agent proceeds with a satisfied action (e.g., condition satisfied action 824) to formally close the incident. This closure includes a comment on the blocking of the IOC and a communication to users to remain vigilant against suspicious activities, reinforcing the importance of proactive cybersecurity measures.

If the reassessment (e.g., conditions 826) reveals an increase in the number of affected endpoints, the passage of 48 hours without resolution, or an association of the IOC with additional threat types, the agent may either disregard these findings due to insufficient risk justification (e.g., condition satisfied action 828) or maintain its observational stance (condition unsatisfied action 830). This operational flexibility allows the Low-Risk Spam Observer 800 to dynamically adjust its response based on the evolving nature of detected spam incidents, thereby ensuring efficient management of low-risk threats and the effective allocation of cybersecurity resources.

Example 7 (e.g., illustrated in FIG. 9), termed as a Low-Risk Spam Observer 2 900, may monitor and manage incidents classified as low-risk spam. This agent operates under a low priority, reflecting its focus on incidents that, while potentially disruptive, do not immediately threaten the integrity or security of the network. Its operational protocol is designed to minimize the allocation of resources to low-risk incidents, ensuring that more significant threats may be addressed promptly and effectively.

Upon detecting a new spam incident (e.g., On New Incident 910), Low-Risk Spam Observer 2 900 evaluates it against conditions 912. These conditions stipulate that the incident must solely pertain to spam, be assessed as low risk, exhibit no signs of persistence, and involve an Indicator of Compromise (IOC) that has been implicated in fewer than three incidents over the past 30 days. If these criteria are met, the agent's action (e.g., condition satisfied action 914) is to observe the incident, placing it under surveillance without immediate further action. This approach allows the agent to monitor the incident for any changes that might escalate its severity or risk profile.

Should the incident not fulfill these initial conditions, indicating a potential for greater risk or a more widespread spam campaign, the agent may undertake various unsatisfied actions (e.g., condition unsatisfied action 916). These range from issuing warnings to users about the potential for a broader attack and advising on protective measures, to escalating the incident to human operators (e.g., network administrators) for in-depth analysis, or opting to ignore the incident if it is deemed not to present a significant threat.

Low-Risk Spam Observer 2 900 also incorporates a timer (e.g., On Timer 920) to reassess the incident 48 hours after the initial detection. This reassessment is based on conditions 922 that include verifying whether the number of affected endpoints remains below a threshold of three, no new threat types have been associated with the IOC, and there have been no subsequent contacts since the first detection. Additionally, the Low-Risk Spam Observer 2 900 assesses whether the incident has been managed through response integration or by the actions of network devices. If these conditions suggest that no further malicious activity has occurred, the agent proceeds with a condition satisfied action 924 to close the incident, including a note that the IOC will continue to be monitored and issuing a reminder to users to stay vigilant against potential spam threats.

If the reassessment reveals an escalation in the threat (e.g., conditions 926), evidenced by an increase in affected endpoints or the association of the IOC with additional threat types, the Low-Risk Spam Observer 2 900 may choose to either disregard the incident due to a lack of significant risk (e.g., condition satisfied action 928) or continue its observation (e.g., condition unsatisfied action 930), awaiting further developments that might necessitate a different response. Through this process, the Low-Risk Spam Observer 2 900 ensures that low-risk spam incidents are managed efficiently, conserving cybersecurity resources while maintaining vigilance against potential escalations in threat level.

Example 8 (e.g., illustrated in FIG. 10), termed as a Low-Risk Spam Observer 3 1000, may monitor incidents identified as low-risk spam over an extended observation period of 45 days. Low-Risk Spam Observer 3 1000 operates with a low priority, focusing on spam-related incidents that are not immediately threatening but require ongoing surveillance to ensure they do not escalate or recur.

Upon detecting a new spam incident (e.g., On New Incident 1010), Low-Risk Spam Observer 3 1000 initiates its evaluation process based on a set of conditions 1012. These conditions check if the incident is solely related to spam, the associated risk is classified as low, there has been no detection of persistence, and the Indicator of Compromise (IOC) has appeared in fewer than three incidents within the last 30 days. If all these criteria are satisfied, the agent's response (e.g., condition satisfied action 1014) is to observe the incident, placing it under passive surveillance without immediate active intervention. This monitoring approach allows the agent to continuously assess the incident's status over the extended period to detect any changes in its behavior or impact.

If the initial assessment conditions are not met, suggesting a potential escalation in threat level or involvement in a wider spam campaign, the agent is equipped to take various unsatisfied actions (e.g., condition unsatisfied action 1016). These may include alerting users to the potential severity of the threat, suggesting enhanced security measures, escalating the incident to human operators (e.g., network administrators) for further analysis, or choosing to ignore the incident if it is deemed to pose an insignificant threat based on additional contextual factors.

Low-Risk Spam Observer 3 1000 employs a timer mechanism (e.g., On Timer 1020) to reassess the incident 45 days after the initial detection. This reassessment involves confirming whether any further contacts associated with the IOC have occurred, the number of affected endpoints remains three or fewer, no new threat types have been associated with the IOC, and that there has been no orchestrated response integration or blocking by network devices. If these conditions (e.g., conditions 1022) indicate no further suspicious or malicious activity, the agent executes a condition satisfied action 1024 to close the incident, annotating that the contacts with the resource are no longer considered malicious and confirming that the IOC has been effectively blocked. Additionally, the Low-Risk Spam Observer 3 1000 advises users to remain vigilant, reporting any suspicious activities and avoiding engagement with unknown links or attachments.

If the reassessment reveals that the number of affected endpoints has increased, or the IOC is associated with additional threat types, the Low-Risk Spam Observer 3 1000 assesses these findings (e.g., conditions 1026). If the risk remains low despite these changes, the agent may choose to ignore the escalation due to insufficient evidence of significant risk (e.g., condition satisfied action 1028). If the risk assessment changes, the agent continues its observation (e.g., condition unsatisfied action 1030), maintaining vigilance and preparedness to escalate its response if necessary. Through this methodical and extended monitoring approach, the Low-Risk Spam Observer 3 1000 ensures that low-risk spam incidents are adequately managed over time, preventing their recurrence and mitigating potential escalations in threat level.

Example 9 (e.g., illustrated in FIG. 11), termed as a Low-Risk Adware Observer 1100, may manage and mitigate incidents involving low-risk adware. Low-Risk Adware Observer 1100 operates with a low priority, focusing on adware events that do not immediately threaten the integrity or security of the network but require monitoring to ensure they do not escalate or recur.

Upon detecting a new adware incident (e.g., On Timer 1120), Low-Risk Adware Observer 1100 evaluates it against a set of conditions (e.g., conditions 1112). These conditions ascertain whether the incident strictly involves adware classified under the TDG Group Adware, the associated risk is deemed low, there is no persistence of the threat, and the Indicator of Compromise (IOC) has appeared in fewer than three incidents within the last 30 days. If these criteria are met, the agent's response (e.g., condition satisfied action 1114) is to observe the incident, initiating a monitoring period without further immediate actions. This allows the agent to efficiently allocate resources while keeping a vigilant eye on incidents that meet its threshold criteria.

If the incident does not meet the initial assessment criteria, suggesting possible higher risk or involvement in a broader adware campaign, the agent is prepared to implement various unsatisfied actions (e.g., condition unsatisfied action 1116). These may include issuing alerts to users about the potential scale of the attack, advising them to enhance their security measures, escalating the incident to human operators (e.g., network administrators) for further analysis, or opting to ignore the incident if it's assessed to pose an insignificant threat.

Low-Risk Adware Observer 1100 employs a timer (e.g., On Timer 1120) to reassess the incident 24 hours after its initial detection. This reassessment involves checking whether there has been any subsequent activity, the number of affected endpoints remains below a threshold of three, no new threat types have been associated with the IOC, and whether the incident has been managed by response integration or by blocking actions from network devices. If these conditions (e.g., conditions 1122) indicate that no further malicious or suspicious activity has occurred, the agent takes a conditioned action (e.g., condition satisfied action 1124) to close the incident formally. This closure includes a comment that no further activity was detected, and that the IOC has been blocked. Additionally, it communicates to users to remain vigilant against potential security threats and to prioritize safe browsing practices, especially on non-corporate websites.

If the reassessment (e.g., conditions 1026) reveals an increase in the number of affected endpoints, the passage of more than 48 hours since the initial contact, or the association of the IOC with additional threat types, Low-Risk Adware Observer 1100 re-evaluates these indicators. If the agent determines the risk remains low despite these factors, it may choose to ignore the escalation due to insufficient risk (e.g., condition satisfied action 1028). If the threat level is deemed increased, the agent continues its observation (e.g., condition unsatisfied action 1030), maintaining readiness to adjust its response based on the evolving nature of the threat.

Through this methodical monitoring and response protocol, the Low-Risk Adware Observer 1100 ensures that adware incidents classified as low-risk are managed effectively, preventing their potential escalation and ensuring the security of the network environment is maintained without overextending resources.

Example 10 (e.g., illustrated in FIG. 12), termed as a Low-Risk Adware Observer 2 1200, may monitor low-risk adware incidents over an extended observation period of 60 days. Given its designation as low priority, this agent is specifically geared towards overseeing incidents that are not immediately detrimental but warrant continued surveillance to prevent potential escalation or reoccurrence.

Upon detecting a new adware-related incident (e.g., On New Incident 1210), Low-Risk Adware Observer 2 1200 initiates an evaluation based on conditions 1212. These criteria determine the management strategy and include verifying that the incident exclusively involves adware classified under the TDG Group, assessing the risk as low, identifying no persistent behavior, and confirming that the Indicator of Compromise (IOC) has been involved in less than three incidents within the last 30 days. If an incident satisfies these conditions, the agent's designated response (e.g., condition satisfied action 1214) is to observe the incident without taking immediate action, thereby allocating monitoring resources efficiently while keeping a watchful eye on the situation.

If the incident does not meet the initial conditions, suggesting potential for greater risk or involvement in a more extensive adware campaign, Low-Risk Adware Observer 2 1200 is equipped to execute various unsatisfied actions (e.g., condition unsatisfied action 1216). These actions might include alerting users about the possibility of a more extensive attack, suggesting enhanced protective measures, escalating the issue to human operators (e.g., network administrators) for more in-depth analysis, or choosing to disregard the incident if it is deemed of negligible consequence.

Security agent 200 employs a timer mechanism (e.g., On Timer 1220) to reassess the incident after 60 days from the initial detection. This reassessment checks for any subsequent activities or contacts, the number of affected endpoints remaining under three, the association of the IOC with any additional threat types, and whether any orchestrated response integration or network device actions have blocked the incident. Should these conditions (e.g., conditions 1222) confirm the absence of further malicious or suspicious activity, the agent proceeds with a condition satisfied action 1224 to formally close the incident. This closure action includes a comment indicating that the contacts with the resource are no longer considered malicious and confirming the blocking of the IOC. Moreover, Low-Risk Adware Observer 2 1200 advises users to stay vigilant and encourages safe browsing practices, especially on non-corporate websites.

If the reassessment reveals an increase in the number of affected endpoints, the passage of more than 60 days since initial contact, or the association of the IOC with additional threat types, Low-Risk Adware Observer 2 1200 reassesses these indicators. If these conditions (e.g., conditions 1226) still depict a low risk, the Low-Risk Adware Observer 2 1200 may choose to ignore the potential escalation (e.g., condition satisfied action 1228) due to insufficient evidence of increased threat. If these findings suggest a heightened threat level, the agent continues its observation (e.g., condition unsatisfied action 1230), remaining prepared to escalate its response if the threat landscape evolves further.

Through this methodical monitoring and adaptive response protocol, the Low-Risk Adware Observer 2 1200 ensures comprehensive management of adware incidents that are initially classified as low-risk, preventing their potential escalation and ensuring the network's security without overextending resources.

Together, these agents form a robust defense mechanism against low-risk cybersecurity threats, employing a combination of observation, user education, and strategic response to maintain network security and user awareness.

Figure 13:
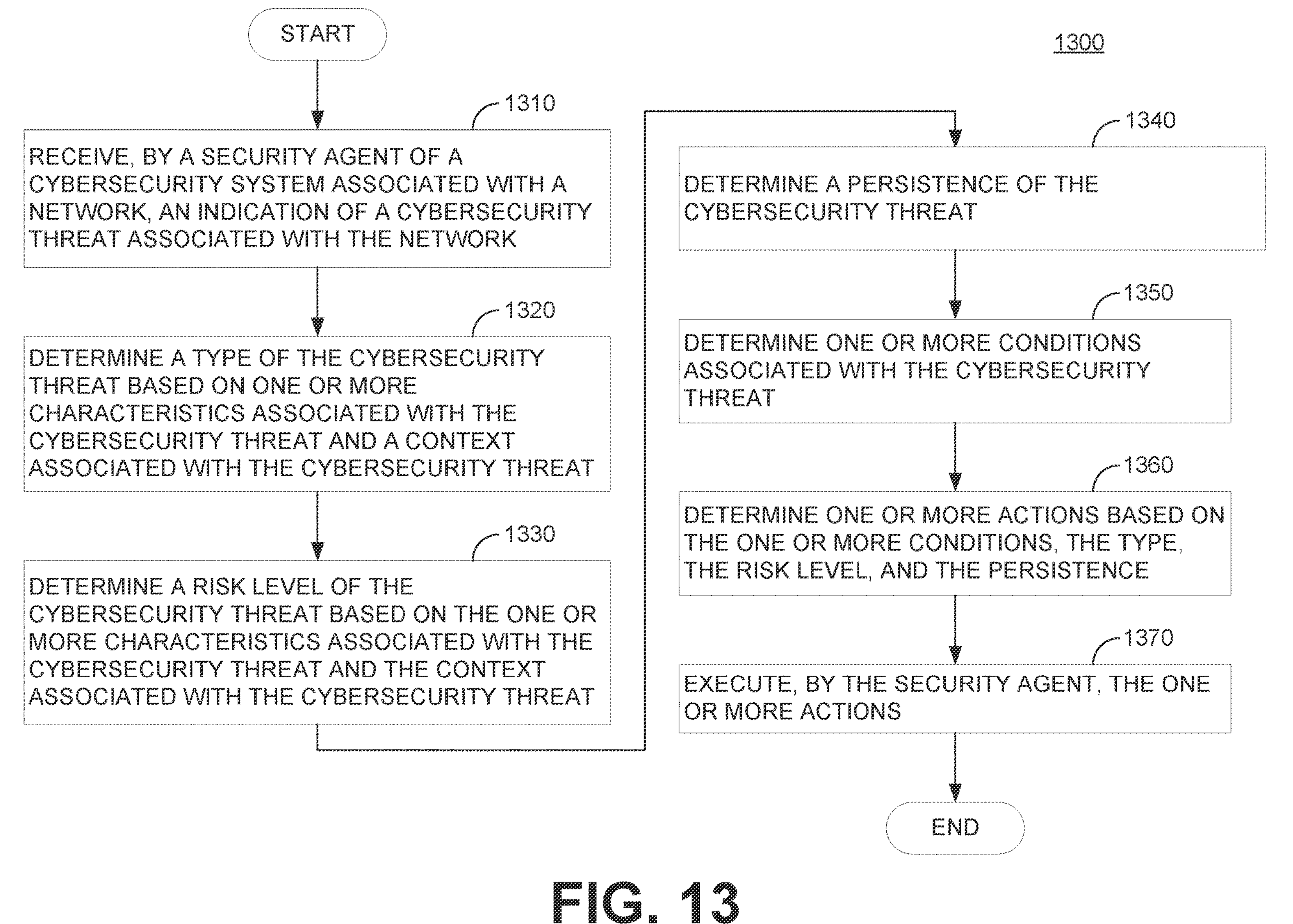
FIG. 13 illustrates an exemplary process for mitigation and remediation of cybersecurity threats.

Referring now to FIG. 13, illustrated is a flowchart of a process 1300, according to one example of the disclosed systems and processes. The process 1300 may demonstrate a technique for mitigation and remediation of cybersecurity threats within a network environment. Process 1300 may enhance network defenses by significantly mitigating potential damages through a sequence of systematic actions performed by a security agent of a cybersecurity system.

At box 1310, the process 1300 may include receiving, by a security agent of a cybersecurity system associated with a network, an indication of a cybersecurity threat associated with the network. The security agent may be a specialized software component designed to monitor network traffic, analyze user behavior, or manage alerts from endpoint protection platforms.

The cybersecurity system may comprise a variety of network security technologies, such as an intrusion detection system (IDS), which monitors network traffic for suspicious activity and known threats, or an intrusion prevention system (IPS) that not only detects but also prevents policy violations. Additionally, an endpoint detection and response (EDR) system may be involved, focusing on real-time monitoring and response to threats at the device level, or a security information and event management (SIEM) system that provides a more holistic view by collecting and analyzing security data from various sources within the network.

The network may vary widely in complexity and scale, from corporate networks to cloud infrastructures or hybrid networks that combine both on-premises and cloud elements. The network may be tasked with handling not only internal traffic and data management but also external communications and data exchanges, making the network susceptible to a range of cybersecurity threats.

Examples of cybersecurity threats may include one or more of phishing attacks (e.g., where attackers masquerade as trustworthy entities to solicit personal information), malware attacks (e.g., involving malicious software designed to disrupt, damage, or gain unauthorized access to computer systems), ransomware (e.g., involving encryption of a victim's data and demands for payment), and/or sophisticated network breaches that could involve multiple stages and tactics.

The security agent may receive the indication of the cybersecurity threat through one or more of the aforementioned systems (e.g., IDS, IPS, EDR, or SIEM), each providing insights based on their specific capabilities and focus areas. Moreover, a time period associated with the indication of the threat may be determined, which may provide valuable insight into understanding urgency and potential impact of the threat. For instance, a threat detected after business hours may indicate a different level of risk and require a different response than one detected during peak operational hours.

At box 1320, the process 1300 may include determining a type of the cybersecurity threat based on one or more characteristics associated with the cybersecurity threat and a context associated with the cybersecurity threat. The type of the cybersecurity threat may be identified through a variety of characteristics. These characteristics may include the method of attack, such as phishing, malware, or a denialof-service attack. Additionally, the payload of the cybersecurity threat, which refers to the part of the malware that performs a malicious action, such as locking files in a ransomware attack or logging keystrokes in a spyware attack, and the target of the attack, such as specific database servers, email systems, or network infrastructure, may be considered in determining the type of threat.

The context associated with the cybersecurity threat may include one or more environmental and situational factors that may be used to assess the threat more accurately. For example, the context may aid in understanding the network topology by mapping out the arrangement of the networks (e.g., including the devices, connections, and architecture), which may influence how a threat spreads or what segments of the network are most vulnerable. As another example, the context may include a security configuration, which may detail the defensive mechanisms already in place, such as firewalls and antivirus software. Additionally, the presence of active security measures in the context, such as continuous monitoring tools and intrusion detection systems, may provide real-time insights into network activity and potential threats. The context may further include the time of detection, as threats detected during high-traffic periods or off-hours might suggest different levels of risk and urgency.

The determination of the threat type may utilize one or more advanced machine learning algorithms that have been trained on the characteristics of known cybersecurity threats. These algorithms may analyze vast amounts of data quickly and identify patterns that match known threats or suggest new or evolving threats based on deviations from these patterns. This capability may allow the cybersecurity system to dynamically adapt its response strategies, ensuring that the most effective measures are taken based on the current threat landscape. This proactive approach aids in minimizing potential damage and enhancing the overall security posture of the network.

At box 1330, the process 1300 may include determining a risk level of the cybersecurity threat based on the one or more characteristics associated with the cybersecurity threat and the context associated with the cybersecurity threat. This determination may establish a severity and potential impact of the cybersecurity threat on the network. For example, the risk level of the cybersecurity threat may be categorized into various degrees, such as low, medium, high, or critical. These categories may be used to prioritize the response, where a high or critical risk may prompt immediate and significant actions such as isolating affected systems, whereas a low-risk threat may lead to more monitoring and less immediate interventions.

Determining the risk level may also involve automated tools and systems that analyze the threat against a database of known threats, use predictive modeling, or apply machine learning algorithms that may evaluate the potential impact based on historical data and current trends. This analysis may provide a quantified risk assessment that supports decision-making processes within the cybersecurity management system, ensuring that responses are commensurate with the threat level identified.

At box 1340, the process 1300 may include determining a persistence of the cybersecurity threat. The persistence of the cybersecurity threat may be associated with an ability of the cybersecurity threat to remain active within a network over an extended period, potentially evading initial detection and response efforts to cause sustained damage or data loss. Understanding whether a cybersecurity threat is likely to be persistent may provide insight into the urgency and scale of the response required. For example, persistent threats may necessitate more robust countermeasures, including deeper system cleanups, more frequent follow-up checks, and possibly even changes to security policies to prevent future occurrences.

Determining the persistence of the cybersecurity threat may include one or more methodologies. For example, ongoing activities related to the cybersecurity threat may be monitored for a predefined period. This monitoring may help to identify whether the threat exhibits recurring patterns or behaviors, such as repeated attempts to access certain network resources or periodic communication with external command and control servers. These observations may indicate whether the threat is a one-time occurrence or if it has the capability to persist and possibly escalate.

Another example for assessing persistence may include comparing the detected threat against a database of known cybersecurity threats. The comparison may reveal if the identified threat matches the behavior of previously cataloged threats that are known for their ability to persist within networks. Such a comparison may reveal, for example, that a detected malware strain is part of a family known for using sophisticated techniques to maintain its presence on infected systems, such as rootkits or polymorphic code.

Additionally, analyzing historical data related to similar cybersecurity threats previously encountered in the network may also be utilized to determine persistence. This analysis may include examining past behavior of similar threat, examining their lifecycles within the network, and/or identifying any common elements or tactics they employed to remain undetected. For instance, if previous incidents involved threats that had mechanisms to disable security measures or to automatically reinstall themselves after apparent removal, similar characteristics in a new threat may indicate a high likelihood of persistence.

At box 1350, the process 1300 may include determining one or more conditions associated with the cybersecurity threat, e.g., utilizing real-time analytics to provide a comprehensive understanding of the threat's characteristics and implications. The conditions may comprise one or more of a broad range of factors, each providing insights into different facets of the cybersecurity threat. For instance, conditions may include the incident type, which categorizes the threat (e.g., malware, phishing, denial of service), helping to tailor the response strategies to the nature of the threat. The risk level, another condition, may assess the immediate and potential damage the threat could cause, prioritizing resources and responses accordingly.

Further conditions may analyze the persistence of the threat, determining if the threat is a one-time occurrence or has ongoing activities that could indicate a sustained attack. The number of incidents in a specified time period may also be a condition, which may provide insight regarding whether the threat is part of a larger pattern or campaign. This insight may be used to identify coordinated attacks or widespread vulnerabilities.

The conditions may also include the elapsed time since the last contact, which may indicate whether the threat is active or dormant, and whether other threat types are associated with the Indicator of Compromise (IOC), providing insight about the versatility and adaptability of the threat. Moreover, assessing whether a response integration orchestrated the incident or whether network devices are effectively blocking the connection may offer insights into the current effectiveness of the network's defenses.

The number of affected endpoints may provide another condition, revealing the scope of the threat's impact across the network. Additionally, checking if the IOC has been associated with more threat types may be used to determine broader implications and potential evolution of the threat.

Incorporating timers as conditions may facilitate monitoring of threats over specific time periods. These timers may trigger reassessments of the threat's status and responses based on the duration of threat activity or inactivity. For example, a timer may be set to review the threat's status after 24 hours to determine if ongoing monitoring or additional actions are required.

By determining these conditions (e.g., through real-time analytics), the cybersecurity system may dynamically adjust its response, ensuring that actions taken are based on the most current and relevant information about the threat. This approach may not only mitigate the immediate threat but also strengthen the network's overall security posture against future incidents.

At box 1360, the process 1300 may include determining one or more actions based on the one or more conditions, the type, the risk level, and the persistence. These one or more actions may efficiently mitigate and manage the threat within the network environment. For example, one or more network segments that are impacted or potentially vulnerable to the threat may be isolated. This isolation may contain the threat and prevent it from spreading to other parts of the network. Similarly, if specific sources of malicious traffic are identified, actions may include blocking traffic to or from these sources, effectively cutting off the threat at its communication points.

Further actions may involve deploying patches or updates to vulnerable systems if the threat exploits known software vulnerabilities. These updates may ensure that vulnerabilities are addressed swiftly to prevent exploitation. Additionally, actions may include modifying firewall rules to block or allow traffic based on the characteristics of the threat. Modifying the firewall rules may include setting up new firewall rules that specifically target traffic patterns associated with the threat, thereby enhancing the network's defenses against similar future attacks.

Communicative actions may also be used to manage cybersecurity threats. For example, sending alerts to network administrators may keep them informed about the threat's nature, current impact, and the actions taken. The alerts may enable administrators to make further strategic decisions and prepare for additional responses if required. In some cases, actions may include observing the threat to gather more intelligence, especially if the threat's behavior is complex or unusual. Some threats may be ignored if they are assessed as benign or if their impact is negligible. Additionally, in situations where the threat requires more sophisticated analysis or intervention, escalating the issue to a human operator (e.g., a network administrator) or specialized response team may be necessary. Other actions may include sending notifications to potentially affected users or departments and closing the investigation if the threat has been neutralized effectively or deemed a non-issue after evaluation. These diverse actions may ensure a comprehensive approach to threat management, balancing immediate responses with long-term security enhancements.

At box 1370, the process 1300 may include executing, by the security agent, the one or more actions. The execution of these actions may be autonomous, allowing for a rapid and efficient response that is crucial in minimizing the impact of the threat. For instance, isolating affected network segments may be automatically triggered based on specific threat detections, such as the presence of ransomware. Similarly, blocking traffic from identified malicious sources may be executed without human intervention, utilizing real-time data and threat intelligence to adapt firewall rules promptly.

The deployment of patches and updates may also be automated, ensuring that all vulnerable systems are updated as soon as a fix is available. This reduces the window of opportunity for attackers to exploit known vulnerabilities. Modifying firewall rules to either block or permit traffic based on the characteristics of the cybersecurity threat may be another action executed autonomously by the security agent. This process may involve dynamically adjusting network access controls based on the evolving threat landscape, ensuring that the network's defenses are always optimized against the most current threats.

In addition to these automated actions, the security agent may also handle communicative tasks such as sending alerts to network administrators. This ensures that while the system operates autonomously, human operators (e.g., network administrators) are apprised and may make informed decisions about further steps if necessary. Actions such as monitoring the threat, providing messages or notifications to users, or escalating issues to human operators (e.g., network administrators) may be initiated based on predefined criteria. This blend of autonomous and semi-autonomous actions may ensure that the network is not only protected efficiently but also managed in a way that leverages both the speed of automation and the insight of human oversight.

Figure 14:
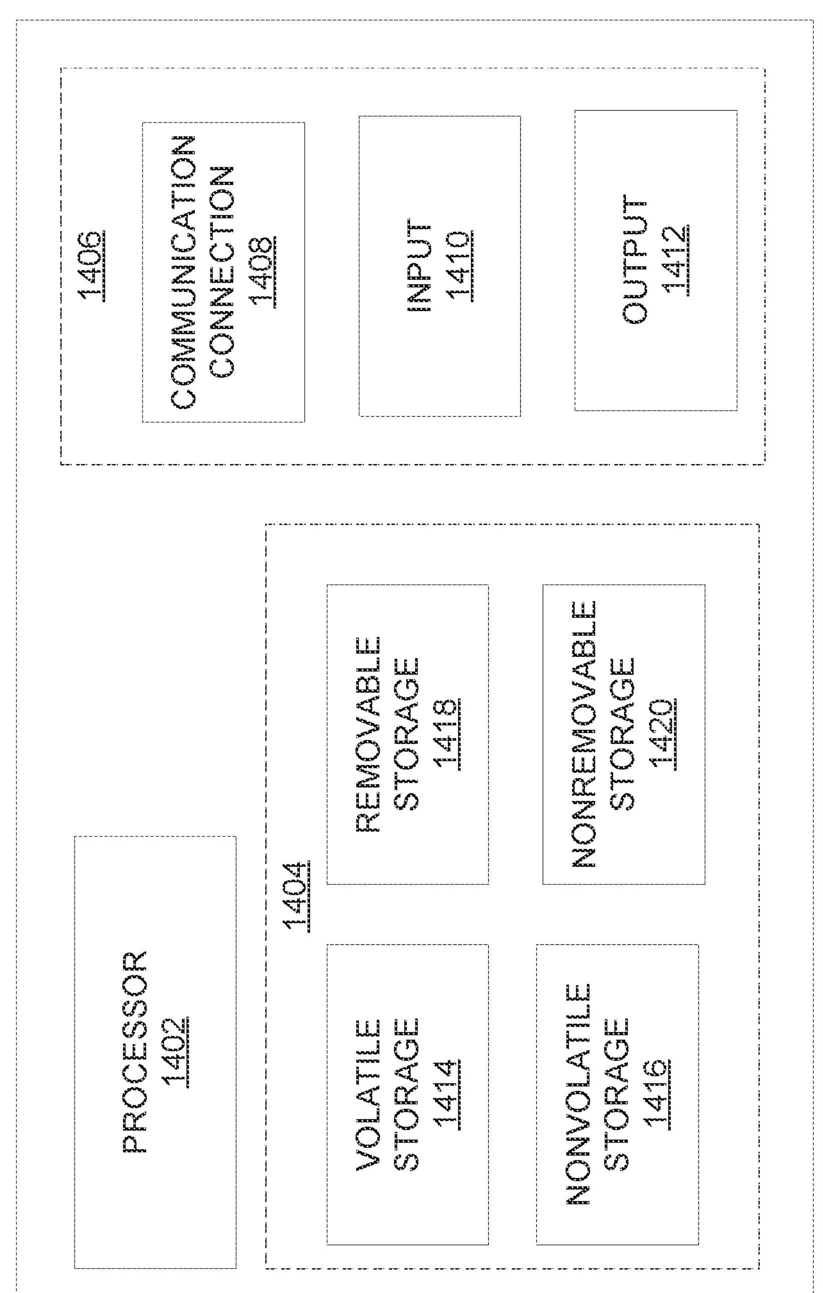
FIG. 14 illustrates a schematic of an exemplary cybersecurity device.

FIG. 14 is a block diagram of a computing device 1400 that may be connected to or comprise a component of cybersecurity system 102. Computing device 1400 may comprise hardware or a combination of hardware and software. The functionality to facilitate cybersecurity may reside in one or a combination of computing devices 1400. Computing device 1400 depicted in FIG. 14 may represent or perform functionality of an appropriate computing device 1400, or a combination of computing devices 1400, such as, for example, a component or various components of a cybersecurity system, a computing device, a processor, a server, a gateway, a database, a firewall, a router, a switch, a modem, an intrusion detection system (IDS), an intrusion prevention system (IPS), a security information and event management (SIEM) system, a data loss prevention (DLP) system, an encryption tool, a virtual private network (VPN), a patch management tool, an identity and access management (IAM) system, a network access control (NAC) device, a cloud access security broker (CASB), a threat intelligence platform, a secure web gateway, an endpoint detection and response (EDR) system, a vulnerability management tool, or the like, or any appropriate combination thereof. It is emphasized that the block diagram depicted in FIG. 14 is exemplary and not intended to imply a limitation to a specific example or configuration. Thus, computing device 1400 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Computing device 1400 may comprise a processor 1402 and a memory 1404 coupled to processor 1402. Memory 1404 may contain executable instructions that, when executed by processor 1402, cause processor 1402 to effectuate operations associated with mitigating cybersecurity threats. As evident from the description herein, computing device 1400 is not to be construed as software per se.

In addition to processor 1402 and memory 1404, computing device 1400 may include an input/output system 1406. Processor 1402, memory 1404, and input/output system 1406 may be coupled together (coupling not shown in FIG. 14) to allow communications between them. Each portion of computing device 1400 may comprise circuitry for performing functions associated with each respective portion. Thus, each portion may comprise hardware, or a combination of hardware and software. Accordingly, each portion of computing device 1400 is not to be construed as software per se. Input/output system 1406 may be capable of receiving or providing information from or to a communications device or other network entities configured for cybersecurity. For example, input/output system 1406 may include a wireless communication (e.g., 3G/4G/5G/GPS) card. Input/output system 1406 may be capable of receiving or sending video information, audio information, control information, image information, data, or any combination thereof. Input/output system 1406 may be capable of transferring information with computing device 1400. In various configurations, input/output system 1406 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 1406 may comprise a Wi-Fi finder, a two-way GPS chipset or equivalent, or the like, or a combination thereof.

Input/output system 1406 of computing device 1400 also may contain a communication connection 1408 that allows computing device 1400 to communicate with other devices, network entities, or the like. Communication connection 1408 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 1406 also may include an input device 1410 such as keyboard, mouse, pen, voice input device, or touch input device. Input/output system 1406 may also include an output device 1412, such as a display, speakers, or a printer.

Processor 1402 may be capable of performing functions associated with cybersecurity, such as functions for mitigating cybersecurity threats, as described herein. For example, processor 1402 may be capable of, in conjunction with any other portion of computing device 1400, automated detection, assessment, and response to cybersecurity threats, as described herein.

Memory 1404 of computing device 1400 may comprise a storage medium having a concrete, tangible, physical structure. As is known, a signal does not have a concrete, tangible, physical structure. Memory 1404, as well as any computer-readable storage medium described herein, is not to be construed as a signal. Memory 1404, as well as any computer-readable storage medium described herein, is not to be construed as a transient signal. Memory 1404, as well as any computer-readable storage medium described herein, is not to be construed as a propagating signal. Memory 1404, as well as any computer-readable storage medium described herein, is to be construed as an article of manufacture.

Memory 1404 may store any information utilized in conjunction with cybersecurity. Depending upon the exact configuration or type of processor, memory 1404 may include a volatile storage 1414 (such as some types of RAM), a nonvolatile storage 1416 (such as ROM, flash memory), or a combination thereof. Memory 1404 may include additional storage (e.g., a removable storage 1418 or a non-removable storage 1420) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by computing device 1400. Memory 1404 may comprise executable instructions that, when executed by processor 1402, cause processor 1402 to effectuate operations to mitigating cybersecurity threats.

Figure 15:
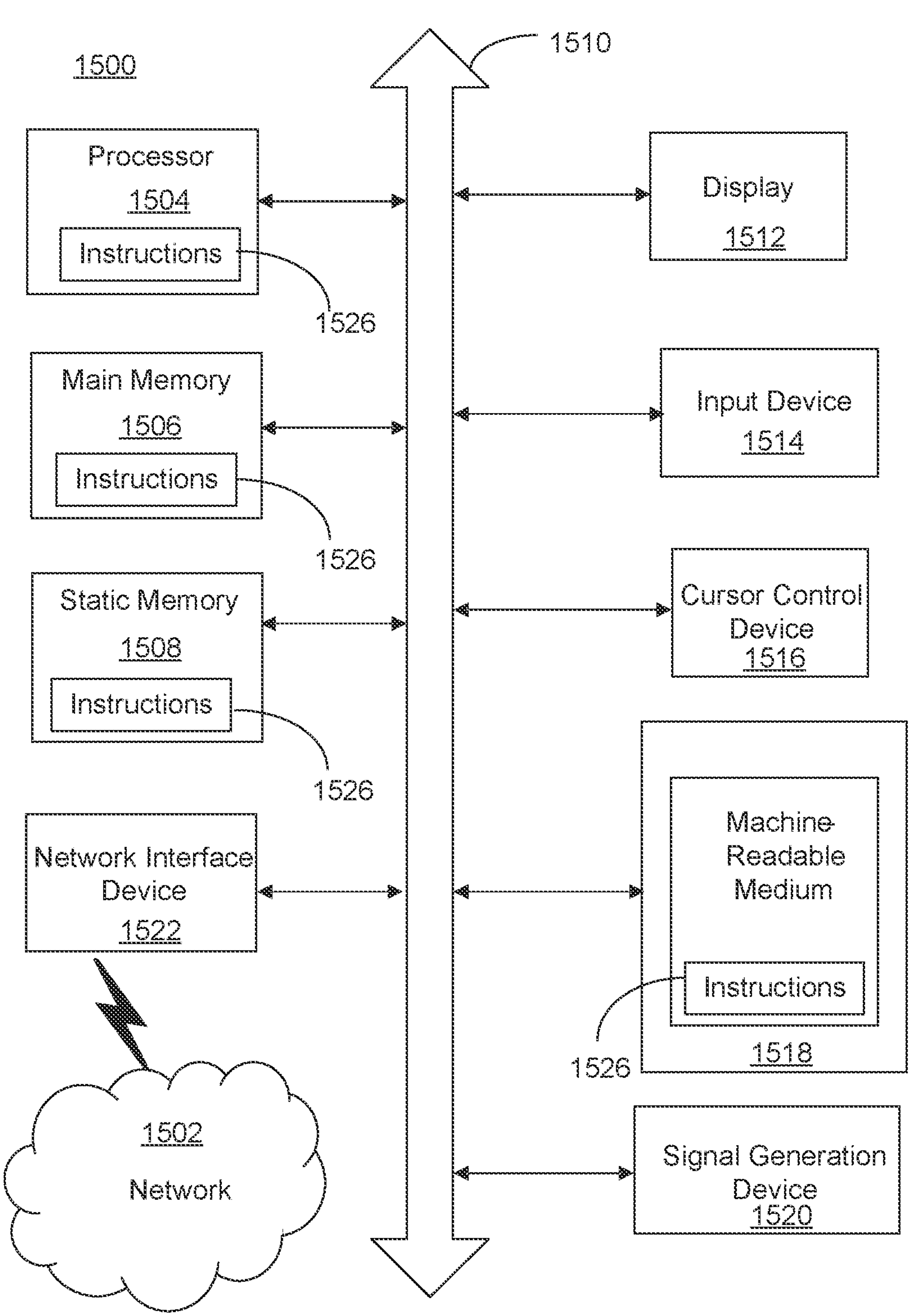
FIG. 15 illustrates an exemplary diagrammatic representation of a machine in the form of a computer system.

FIG. 15 depicts an exemplary diagrammatic representation of a machine in the form of a computer system 1500 within which a set of instructions, when executed, may cause the machine to perform any one or more of the methods described above. One or more instances of the machine can operate, for example, as computing device 1400, processor 1402, cybersecurity system 102, computing devices 104, server 108, database 110, and other devices of FIGS. 1-14. In some examples, the machine may be connected (e.g., using a network 1502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 1500 may include a processor (or controller) 1504 (e.g., a central processing unit (CPU)), a graphics processing unit (GPU, or both), a main memory 1506 and a static memory 1508, which communicate with each other via a bus 1510. The computer system 1500 may further include a display unit 1512 (e.g., a liquid crystal display (LCD), a flat panel, or a solid-state display). Computer system 1500 may include an input device 1514 (e.g., a keyboard), a cursor control device 1516 (e.g., a mouse), a disk drive unit 1518, a signal generation device 1520 (e.g., a speaker or remote control) and a network interface device 1522. In distributed environments, the examples described in the subject disclosure can be adapted to utilize multiple display units 1512 controlled by two or more computer systems 1500. In this configuration, presentations described by the subject disclosure may in part be shown in a first of display units 1512, while the remaining portion is presented in a second of display units 1512.

The disk drive unit 1518 may include a tangible computer-readable storage medium on which is stored one or more sets of instructions (e.g., instructions 1526) embodying any one or more of the methods or functions described herein, including those methods illustrated above. Instructions 1526 may also reside, completely or at least partially, within main memory 1506, static memory 1508, or within processor 1504 during execution thereof by the computer system 1500. Main memory 1506 and processor 1504 also may constitute tangible computer-readable storage media.

While examples of a system for cybersecurity threats have been described in connection with various computing devices/processors, the underlying concepts may be applied to any computing device, processor, or system capable of facilitating a cybersecurity system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer readable storage medium is not a propagating signal. A computer-readable storage medium as described herein is an article of manufacture. When the program code is loaded into and executed by a machine, such as a computer, the machine becomes a device for cybersecurity. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a cybersecurity system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an erasable programmable read-only memory (EPROM), a gate array, a programmable logic device (PLD), a client computer, or the like, the machine becomes a device for implementing cybersecurity as described herein. When implemented on a general-purpose processor, the program code combines with the processor to provide a unique device that operates to invoke the functionality of a cybersecurity system.

While the disclosed systems have been described in connection with the various examples of the various figures, it is to be understood that other similar implementations may be used, or modifications and additions may be made to the described examples of a cybersecurity system without deviating therefrom. For example, one skilled in the art will recognize that a cybersecurity system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—automated detection, assessment, and response to cybersecurity threats—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

What is claimed:

1. One or more computing devices, comprising one or more processors, configured to:

receive, by a security agent of a cybersecurity system associated with a network, an indication of a cybersecurity threat associated with the network;

determine a type of the cybersecurity threat based on one or more characteristics associated with the cybersecurity threat and a context associated with the cybersecurity threat;

determine a risk level of the cybersecurity threat based on the one or more characteristics associated with the cybersecurity threat and the context associated with the cybersecurity threat;

determine a persistence of the cybersecurity threat based on detection of recurring activities or repeated attempts associated with the cybersecurity threat;

determine one or more conditions associated with the cybersecurity threat, wherein the one or more conditions comprises one or more conditional logic evaluating characteristics;

determine one or more actions based on a combination of the one or more conditions, the type, the risk level, and the persistence; and execute, by the security agent, the one or more actions.

2. The one or more computing devices of claim 1, wherein the one or more actions include isolating one or more network segments associated with the cybersecurity threat.

3. The one or more computing devices of claim 1, wherein the one or more actions include blocking traffic to or from one or more identified malicious sources associated with the cybersecurity threat.

4. The one or more computing devices of claim 1, wherein the one or more actions are determined based on an artificial intelligence model.

5. The one or more computing devices of claim 1, wherein the one or more actions include modifying a firewall rule to block or allow traffic associated with the cybersecurity threat.

6. The one or more computing devices of claim 1, wherein the execution of the one or more actions is performed autonomously without requiring manual approval from a human operator.

7. The one or more computing devices of claim 1, wherein the determination of the type of the cybersecurity threat is based on a machine learning algorithm trained on characteristics of known cybersecurity threats.

8. The one or more computing devices of claim 1, wherein the one or more computing devices are further configured to update one or more operational parameters associated with the security agent.

9. The one or more computing devices of claim 1, wherein determining the persistence of the cybersecurity threat comprises monitoring ongoing activities related to the cybersecurity threat for a predefined period to identify recurring patterns or behaviors.

10. The one or more computing devices of claim 1, wherein determining the persistence of the cybersecurity threat comprises comparing the cybersecurity threat with a database of known cybersecurity threats.

11. The one or more computing devices of claim 1, wherein determining the persistence of the cybersecurity threat comprises analyzing historical data related to similar cybersecurity threats previously encountered in the network.

12. The one or more computing devices of claim 1, wherein the one or more computing devices are further configured to determine a time period associated with the indication of the cybersecurity threat, wherein determining the one or more actions is further based on the time period.

13. The one or more computing devices of claim 1, wherein the one or more conditions associated with the cybersecurity threat are determined based on one or more real-time analytics.

14. The one or more computing devices of claim 1, wherein the indication of the cybersecurity threat is received from one or more of an intrusion detection system, an intrusion prevention system, an endpoint detection and response system, or a security information and event management system.

15. The one or more computing devices of claim 1, wherein the one or more characteristics comprise one or more of a method of attack, a payload of the cybersecurity threat, or a target associated with the cybersecurity threat.

16. The one or more computing devices of claim 1, wherein the context associated with the cybersecurity threat comprises one or more of a network topology, a security configuration, active security measures, or a time of detection.

17. A method performed by one or more computing devices, the method comprising:

receiving, by a security agent of a cybersecurity system associated with a network, an indication of a cybersecurity threat associated with the network;

determining a type of the cybersecurity threat based on one or more characteristics associated with the cybersecurity threat and a context associated with the cybersecurity threat;

determining a risk level of the cybersecurity threat based on the one or more characteristics associated with the cybersecurity threat and the context associated with the cybersecurity threat;

determining a persistence of the cybersecurity threat based on detection of recurring activities or repeated attempts associated with the cybersecurity threat;

determining one or more conditions associated with the cybersecurity threat, wherein the one or more conditions comprises one or more conditional logic evaluating characteristics;

determining one or more actions based on a combination of the one or more conditions, the type, the risk level, and the persistence; and executing, by the security agent, the one or more actions.

18. The method of claim 17, wherein the one or more actions are determined based on an artificial intelligence model.

19. The method of claim 17, wherein the determination of the type of the cybersecurity threat is based on a machine learning algorithm trained on characteristics of known cybersecurity threats.

20. A system comprising:

one or more processors; and memory coupled with the one or more processors, the memory storing executable instructions that when executed by the one or more processors cause the one or more processors to effectuate operations comprising:

receiving, by a security agent of a cybersecurity system associated with a network, an indication of a cybersecurity threat associated with the network;

determining a type of the cybersecurity threat based on one or more characteristics associated with the cybersecurity threat and a context associated with the cybersecurity threat;

determining a risk level of the cybersecurity threat based on the one or more characteristics associated with the cybersecurity threat and the context associated with the cybersecurity threat;

determining a persistence of the cybersecurity threat based on detection of recurring activities or repeated attempts associated with the cybersecurity threat;

determining one or more conditions associated with the cybersecurity threat, wherein the one or more conditions comprises one or more conditional logic evaluating characteristics;

determining one or more actions based on a combination of the one or more conditions, the type, the risk level, and the persistence; and executing, by the security agent, the one or more actions.

* * * * *